(12) United States Patent
Iwatsu et al.

(10) Patent No.: US 7,774,351 B2
(45) Date of Patent: Aug. 10, 2010

(54) DATA RECORDING CONTROL APPARATUS

(75) Inventors: Takeshi Iwatsu, Kanagawa (JP); Noriyuki Sakoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 10/563,258

(22) PCT Filed: May 18, 2004

(86) PCT No.: PCT/JP2004/007022

§ 371 (c)(1), (2), (4) Date: Jan. 4, 2006

(87) PCT Pub. No.: WO2005/029496

PCT Pub. Date: Mar. 31, 2005

(65) Prior Publication Data
US 2007/0112862 A1 May 17, 2007

(30) Foreign Application Priority Data
Sep. 24, 2003 (JP) ............................. 2003-332566

(51) Int. Cl.
G06F 17/30 (2006.01)
(52) U.S. Cl. ...................................... 707/758; 707/782
(58) Field of Classification Search .................. None
See application file for complete search history.

(56) References Cited

U.S. PATENT DOCUMENTS

| | | | | |
|---|---|---|---|---|
| 6,243,774 B1 * | 6/2001 | Eide et al. | ................... | 710/302 |
| 6,320,943 B1 * | 11/2001 | Borland | .................. | 379/112.01 |
| 6,628,936 B1 * | 9/2003 | Furuya | ..................... | 455/412.1 |
| 7,103,369 B2 * | 9/2006 | Sato et al. | ................ | 455/456.3 |
| 2002/0143770 A1 * | 10/2002 | Schran et al. | .................. | 707/10 |
| 2004/0010634 A1 * | 1/2004 | Takashima | ..................... | 710/1 |
| 2004/0122873 A1 * | 6/2004 | Wright et al. | ............... | 707/205 |
| 2005/0060701 A1 | 3/2005 | Murase | | |

(Continued)

FOREIGN PATENT DOCUMENTS

JP 6-309789 11/1994

(Continued)

OTHER PUBLICATIONS

U.S. Appl. No. 10/526,902, filed Aug. 16, 2005, Yamashita et al.

(Continued)

Primary Examiner—Neveen Abel Jalil
Assistant Examiner—Son T Hoang
(74) Attorney, Agent, or Firm—Oblon, Spivak, McClelland, Maier & Neustadt, L.L.P.

(57) ABSTRACT

If the storage medium runs out of space when storing clip-target information as clip data, data having higher deletion-target priority than others is deleted from among a plurality of stored data to have empty spaces on the storage medium, and then the new clip-target information is stored. The deletion-target priority is determined based on attribution of a plurality of stored data. In this manner, new clip-target information is stored without user's operation, after automatically deleting data having higher deletion-target priority than others (the deletion-target priority is determined based on attribution of clip data). Therefore it is avoided that important clip data is automatically deleted without a user being notified.

22 Claims, 20 Drawing Sheets

U.S. PATENT DOCUMENTS

2005/0091679 A1    4/2005   Tanaka et al.

FOREIGN PATENT DOCUMENTS

| | | | |
|---|---|---|---|
| JP | 11-232840 | | 8/1999 |
| JP | 2001-101793 | | 4/2001 |
| JP | 2002-176578 | | 6/2002 |
| JP | 2002-203364 | | 7/2002 |
| JP | 2003-23598 | | 1/2003 |
| JP | 2003-173278 | * | 6/2003 |
| JP | 2003-189214 | | 7/2003 |
| WO | WO 03/015402 A1 | | 2/2003 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

| MUSIC TITLES | ARTISTS | GENRES | ... | SOURCES | REGISTRATION DATE AND TIME |
|---|---|---|---|---|---|
| TO ME | HAMAZAKI AMI | POPS | ... | RADIO (NOW-ON-AIR INFORMATION) | 2004/05/01 10:35 |
| BLUE TRIANGLE | DJC | ROCK | ... | RADIO (NOW-ON-AIR INFORMATION) | 2004/05/02 11:10 |
| SAKURA | SUMASHIGAO | POPS | ... | CD (CD MUSIC INFORMATION) | 2004/06/03 8:45 |
| BEYOND THE STARLIT SKY | SUMASHIGAO | POPS | ... | CD (CD MUSIC INFORMATION) | 2004/06/03 8:46 |
| ... | ... | ... | ... | ... | ... |

FIG. 15

DATA RECORDING CONTROL APPARATUS

TECHNICAL FIELD

The present invention relates to a data storage control apparatus, and is preferably applied to a storage control technique, e.g., which is used when receiving music being broadcast in radio programs, storing the music in a hard disc, and storing music information such as a title and artist name relating to the music in the hard disc.

BACKGROUND ART

Conventionally, radio receivers, which include audio stereo reproduction systems such as all-in-one audio systems and separate stereo components, portable audio systems, and car-mounted audio systems, receive broadcast signals being broadcast from radio stations, and demodulate them. Users therefore can listen to programs and music.

Each radio station provides information about its programs using Internet's homepages. Specifically, radio stations that transmit broadcast signals to listeners provide listeners with music information about a title of broadcasted music, an artist name of the music, a title and number of a CD which records the music, and the like. The music information is also referred to as radio broadcast information.

An audio reproduction apparatus is provided having Internet connection function and radio reception function. In this case, the audio reproduction apparatus is equivalent to a client terminal. The audio reproduction apparatus is a system which is capable of acquiring the music information and receiving radio programs at the same time.

With this audio reproduction apparatus, a user can acquire radio broadcast information about a title and artist name of music being broadcast in a radio program and the like from prescribed servers during listening to the radio program via the audio reproduction apparatus.

At this time, the audio reproduction apparatus is able to record the music received from a radio station in a hard disc. The audio reproduction apparatus also receives radio broadcast information relating to the music from prescribed servers and stores (also referred to as clip) it in the hard disc.

The hard disc that stores music contents and radio broadcast information relating to the music generally has a major storage portion for storing a number of music contents. On the other hand, the hard disc has a much smaller storage portion for storing radio broadcast information.

Accordingly, the audio reproduction apparatus for example automatically delete the oldest one from among a plurality of stored radio broadcast information to store a new one, when the storage portion for storing radio broadcast information runs out of space (see Patent Document 1, for example).

Patent Document 1: Japanese Patent Laid-Open No. 11-232840

Since the method noted above deletes the oldest one from among a plurality of radio broadcast information, it may delete radio broadcast information which is not necessarily useless and sometimes important to users. Even though the method could be useful to users, it may cause a problem that users unknowingly lose their very important radio broadcast information.

DISCLOSURE OF THE INVENTION

The present invention has been made in view of the above points and is intended to provide a data storage control apparatus for storing the latest data so as to replace the most unnecessary data without deleting very important data to users.

To solve the above problem, a data storage control apparatus in accordance with the present invention comprises: data attribution detection means for detecting attribution of storing-target data; determination means for determining whether or not the storage of the data is to be performed based on the attribution of the data detected by the data attribution detection means; data deletion means for deleting data having higher deletion-target priority than others from among a plurality of stored data, if the determination means determines that the storage of the data is to be performed and a storage medium for storing the data runs out of space, the deletion-target priority being determined based on attribution of the plurality of stored data; and data storage means for storing the storing-target data in the storage medium after the data deletion means deletes data having the higher deletion-target priority.

In this manner, clip-target information is stored in the storage medium without user's operation, after automatically deleting data having higher deletion-target priority than others (the deletion-target priority is determined based on attribution of data). Therefore it is avoided that important data is automatically deleted without a user being notified.

Also, a data storage control method in accordance with the present invention comprises the steps of: a data attribution detection step of detecting attribution of storing-target data; a determination step of determining whether or not the storage of the data is to be performed based on the attribution of the data detected by the data attribution detection step; a data deletion step of deleting data having higher deletion-target priority than others from among a plurality of stored data, if the determination step determines that the storage of the data is to be performed and a storage medium for storing the data runs out of space, the deletion-target priority being determined based on attribution of the plurality of stored data; and a data storage step of storing the storing-target data in the storage medium after the data deletion step deletes data having the higher deletion-target priority.

In this manner, clip-target information is stored in the storage medium without user's operation, after automatically deleting data having higher deletion-target priority than others (the deletion-target priority is determined based on attribution of data). Therefore it is avoided that important data is automatically deleted without a user being notified.

Further, a data storage control program in accordance with the present invention causes a data storage control apparatus to execute the steps of: a data attribution detection step of detecting attribution of storing-target data; a determination step of determining whether or not the storage of the data is to be performed based on the attribution of the data detected by the data attribution detection step; a data deletion step of deleting data having higher deletion-target priority than others from among a plurality of stored data, if the determination step determines that the storage of the data is to be performed and a storage medium for storing the data runs out of space, the deletion-target priority being determined based on attribution of the plurality of stored data; and a data storage step of storing the storing-target data in the storage medium after the data deletion step deletes data having the higher deletion-target priority.

In this manner, clip-target information is stored in the storage medium without user's operation, after automatically deleting data having higher deletion-target priority than others (the deletion-target priority is determined based on attribution of data). Therefore it is avoided that important data is automatically deleted without a user being notified.

As described above, according to the present invention, clip-target information is stored in the storage medium without user's operation, after automatically deleting data having higher deletion-target priority than others (the deletion-target priority is determined based on attribution of data). Therefore it is avoided that important data is automatically deleted without a user being notified. As a result, a data storage control apparatus, a data storage control method and a data storage control program are provided capable of storing the latest data so as to replace the most unnecessary data without deleting very important data to users.

BRIEF DESCRIPTION OF THE DRAWINGS

FIG. 15 is a schematic diagram showing the configuration of a clip database.

BEST MODE FOR CARRYING OUT THE INVENTION

An embodiment of the present invention will be described in detail with reference to the accompanying drawings.

(1) Music Related Service Provision System (1-1) System Configuration

Figure 1:
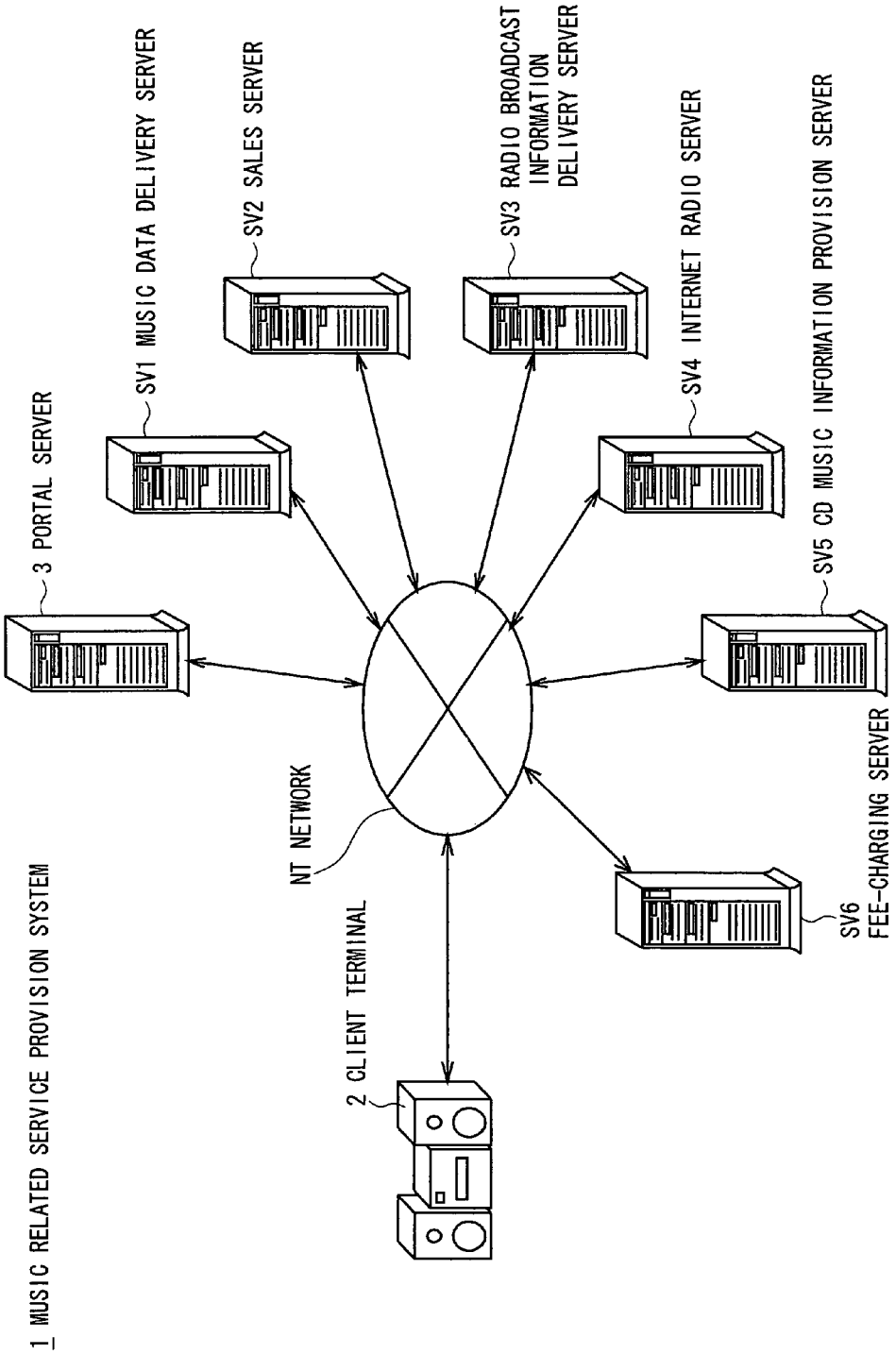
FIG. 1 is a schematic diagram showing the overall configuration of a music related service provision system in accordance with the present embodiment.

With reference to FIG. 1, the reference numeral 1 denotes a music related service provision system as a whole in the present embodiment. The music related service provision system 1 includes a client terminal 2, a portal server 3, other various servers SV1 through SV6. A user of the client terminal 2 is under contract to a company operating the music related service provision system 1. The portal server 3 manages the client terminal 2. A plurality of servers SV1 through SV6 provides the client terminal 2 with various kinds of services relating to music.

In this embodiment, the music data delivery server SV1 provides distribution services for distributing music data to the client terminal 2. The music data is converted into such formats as ATRAC3 (Adaptive Transform Acoustic Coding 3), AAC (Advanced Audio Coding), WMA (Windows Media Audio), RealAUDIO G2 Music Codec, MP3 (MPEG Audio Layer-3), and the like.

A sales server SV2 provides sales services for selling Compact Discs (CDs), Digital Versatile Discs (DVDs), and the like to users through the client terminal 2.

A radio broadcast information delivery server SV3 provides radio broadcast information distribution services for distributing to the client terminal 2 radio broadcast information relating to music and radio program contents broadcast by radio stations.

An Internet radio server SV4 provides Internet radio broadcast services. In the radio broadcast services, the Internet radio server SV4 supplies radio broadcast data encoded into a streaming format to the client terminal 2 via a network NT. In this case, the network NT is equivalent to the Internet.

A CD music information provision server SV5 provides CD music information provision services. In the CD music information provision services, the CD music information provision server SV5 supplies music information to the client terminal 2. The music information includes a title of a music CD, titles of music recorded in the music CD, artist names, genres, and the like. In this case, the music CD is the one available in the market. The music information is also referred to as "CD music information".

A fee-charging server SV6 performs fee-charging processes to charge users various fees in response to requests from the portal server 3 and the like.

(1-2) Configuration of Client Terminal 2

(1-2-1) Functional Circuit Block Configuration of Client Terminal 2

Figure 2:
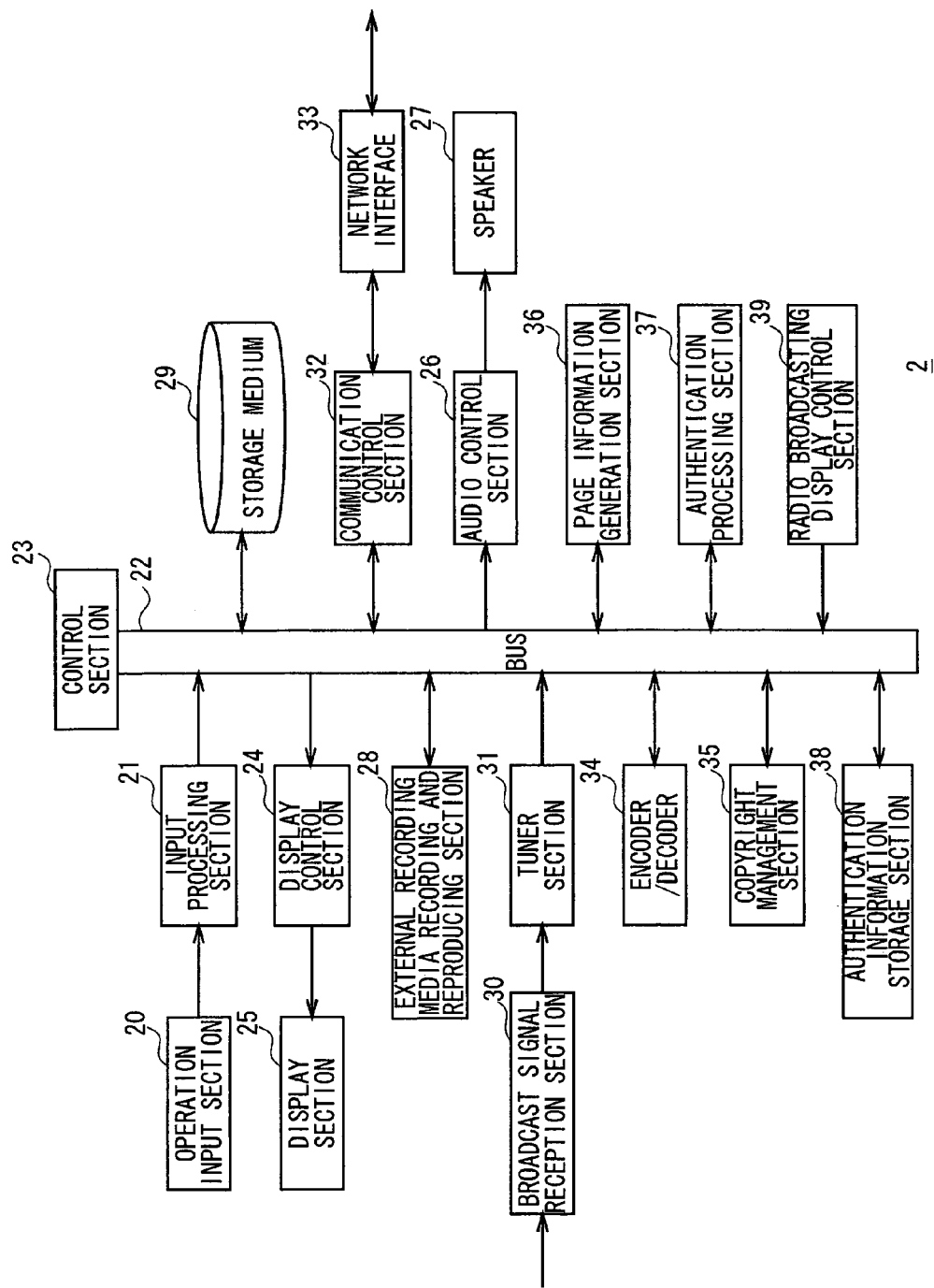
FIG. 2 is a block diagram showing the hardware configuration of a client terminal using functional circuit blocks.

The following describes the hardware configuration of the client terminal 2 using functional circuit blocks. As shown in FIG. 2, the client terminal 2 has an operation input section 20 which includes various kinds of buttons. The operation input section 20 is disposed on the surface of the cabinet of the client terminal 2 or remote control (not shown). If a user operates the operation input section 20, the operation input section 20 detects the operation, and supplies operation input signals corresponding to the operation to an input processing section 21.

The input processing section 21 converts the operation input signals provided by the operation input section 20 into prescribed operation commands, and transmits them via a bus 22 to a control section 23.

The control section 23 is connected to each circuit via the bus 22. The control section 23 controls operation of each circuit based on operation commands and control commands provided by each circuit.

A display control section 24 receives video data via the bus 22, and performs digital-to-analog conversion for the video data to generate analog video signals. The display control section 24 then supplies the analog video signals to the display section 25.

For example, the display section 25 is a display device such as a liquid crystal display. The display section 25 may be disposed on the surface of the cabinet directly or externally.

The display section 25 receives analog video signals from the display control section 24, and displays images based on the analog video signals. The analog video signals may be correspond to processing results of the control section 23 or various kinds of video data.

An audio control section 26 receives audio data via the bus 22, and performs digital-to-analog conversion for the audio data to generate analog audio signals. The audio control section 26 then transmits the analog audio signals to a speaker 27. The speaker 27 output audio based on the analog audio signals supplied from the audio control section 26.

For example, external storage media such as CDs and MEMORY STICK (Registered Trademark of Sony Corporation) store contents data. The MEMORY STICK consists of flash memories covered with exterior cases. An external recording media recording and reproducing section 28 reads content data from external storage media, and then reproduces them. Alternatively, the external recording media recording and reproducing section 28 records record-target content data on external storage media.

If the external recording media recording and reproducing section 28 obtains video data (content data) from an external storage medium, the external recording media recording and reproducing section 28 then transmits the video data via the bus 22 to the display control section 24.

The display control section 24 converts the video data to analog video signals, then transmits the analog video signals to the display section 25. By the way, the video data (content data) is read from the external storage medium by the external recording media recording and reproducing section 28.

If the external recording media recording and reproducing section 28 obtains audio data (content data) from an external storage medium, the external recording media recording and reproducing section 28 then transmits the audio data via the bus 22 to the audio control section 26.

The audio control section 26 converts the audio data to analog audio signals, then transmits the analog audio signals to the speaker 27. By the way, the audio data (content data) is read from the external storage medium by the external recording media recording and reproducing section 28.

A storage medium 29 is disposed in the client terminal 2. The control section 23 transmits content data read from external storage media by the external recording media recording and reproducing section 28 via the bus 22 to a storage medium 29 to store the content data in the storage medium 29 (storing content data in the storage medium 29 as described above is referred to as "ripping").

If the control section 23 obtains video data (content data) from the storage medium 29, the control section 23 then supplies the video data via the bus 22 to the display control section 24. The video data is for example equivalent to image data.

If the control section 23 obtains audio data (content data) from the storage medium 29, the control section 23 then supplies the audio data via the bus 22 to the audio control section 26.

The control section 23 also reads music data from the storage medium 29, and supplies the music data to the external recording media recording and reproducing section 28 to records the music data on external storage media.

A broadcast signal reception section 30 receives radio waves from each broadcast station, and then transmits radio waves to a tuner section 31.

For example, a user operates the operation input section 20 to specify a certain radio station. The tuner section 31 under the control of the control section 23 extracts radio broadcast signals of the frequency corresponding to the specified station from radio waves received by the broadcast signal reception section 30. The tuner section 31 then performs prescribed reception processes to generate audio data, and supplies the audio data via the bus 22 to the audio control section 26.

The audio control section 26 receives the audio data from the tuner section 31, and converts the audio data to analog audio signals. The audio control section 26 then transmits the analog audio signals to the speaker 27. The speaker 27 therefore outputs audio of a radio program broadcast from a radio station. As a result, a user can listen to audio of a radio program.

The control section 23 supplies audio data obtained by the tuner section 31 to the storage medium 29 to store it in the storage medium 29. In this manner, the control section 23 can record audio of a radio program.

The control section 23 also connects with the network NT through a communication control section 32 and a network interface 33 in order. The control section 23 therefore can access the portal server 3 and other servers SV1 through SV5 on the network NT. The control section 23 interchanges various kinds of information and data with the portal server 3 and other servers SV1 through SV5.

An encoder/decoder section 34 decodes compressed-coded content data, and transmits it to the display control section 24 or the audio control section 26. The compressed-coded content data is obtained from the network NT via the network interface 33 and the communication control section 32 in order, or the storage medium 29, or external storage media.

The encoder/decoder section 34 performs compression code processes for content data, audio data supplied from the tuner section 31 or the like to generate compressed-coded content data, and supplies it to the storage medium 29. For example, the content data which is neither compressed nor coded is read from external storage media.

The compressed-coded content data generated by the encoder/decoder section 34 therefore is stored in the storage medium 29 by the control of the control section 23.

The copyright management section 35 generates copyright management information for content data downloaded from the network NT via the network interface 33 and the communication control section 32 in order. The copyright management section 35 also generates copyright management information for content data read from external storage media by the external recording media recording and reproducing section 28.

The copyright management information generated by the copyright management section 35 is to be associated with corresponding content data, and to be stored in the storage medium 29 by the control of the control section 23.

The copyright management section 35 properly updates copyright management information associated with content data, when performing check-out processes of the content data between the storage medium 29 and a specific external storage medium, or when performing check-in processes of the content data between the storage medium 29 and a specific external storage medium. In this manner, the copyright management section 35 protects copyright of the content data.

A page information generation section 36 interprets page information to generate video data which is to be displayed on the display section 25. The page information includes extensible Markup Language (XML) files or Hyper Text Markup Language (HTML) files obtained from the network NT via the network interface 33 and the communication control section 32 in order. The page information generation section 36 then supplies the video data to the display control section 24.

An authentication processing section 37 connects with the portal server 3 and other servers SV1 through SV4 on the network NT via the network interface 33. The authentication processing section 37 performs authentication processes such as transmitting authentication information to the portal server 3 and other servers SV1 through SV4 via the communication control section 32 and the network interface 33 in order.

An authentication information storage section 38 stores authentication information. The authentication processing section 37 requires the authentication information when accessing the portal server 3 and other servers SV1 through SV4.

A radio broadcasting display control section 39, when receiving a radio program to let users listen to it, transmits request signals for requesting radio broadcast information relating to the radio program to the radio broadcast information delivery server SV3 corresponding to a radio station which broadcasts the received radio program via the communication control section 32 and the network interface 33 in order.

As a result, the radio broadcasting display control section 39 receives radio information transmitted from the radio information delivery server SV3 on the network NT via the network interface 33 and the communication control section 32 in order, and supplies the radio information to the display control section 24. The display section 25 therefore displays radio information which includes a title of the received radio program, a title of received music, and an artist name of the music.

The radio broadcasting display control section 39 stores (clips) radio information in a clip database, when a user instructs to store the radio information displayed on the display section 25. The clip database is previously constructed at the storage medium 29. The clip database is further described below.

(1-2-2) Directory Management

Figure 3:
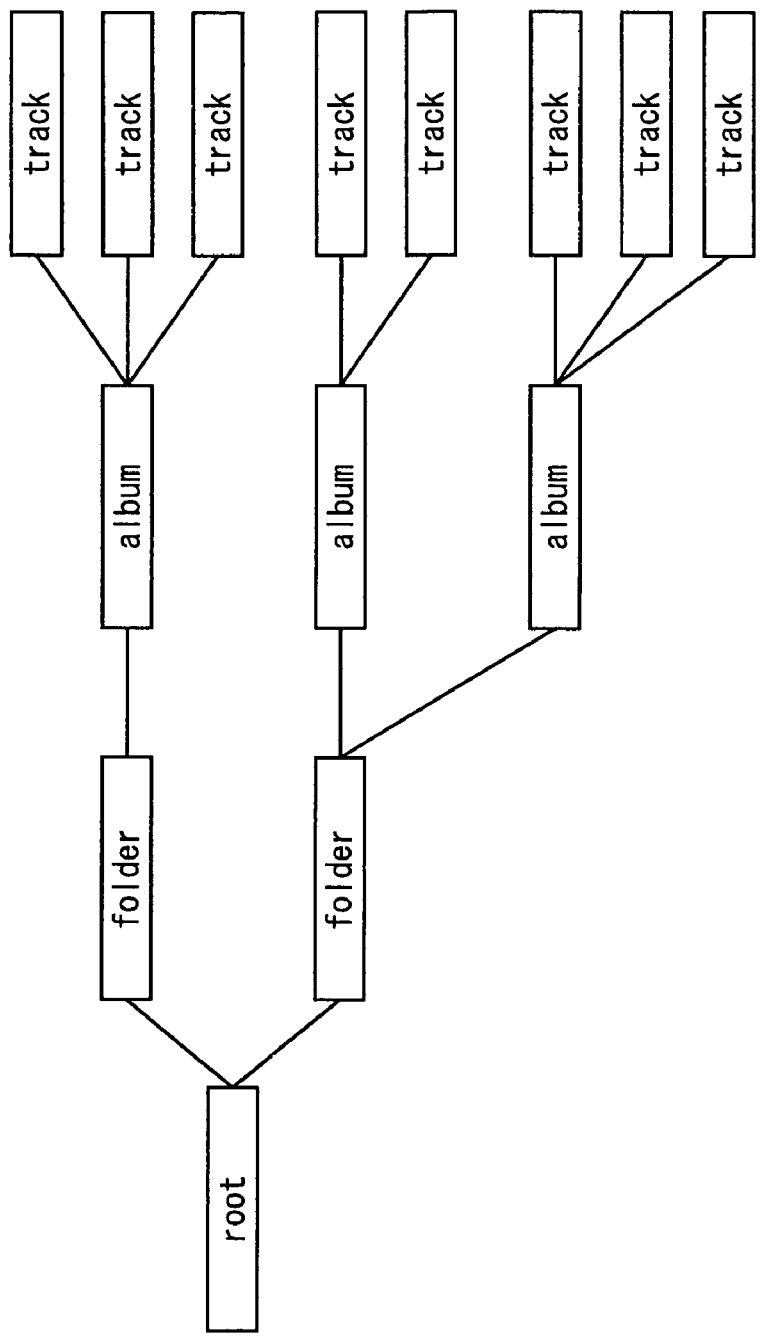
FIG. 3 is a schematic diagram showing a directory structure.

The control section 23 of the client terminal 2 manages content data stored in the storage medium 29 using a directory structure as shown in FIG. 3. One or more "folder" directories are created under a "root" directory. Specifically, the number of the "folder" directories created under the "root" directory is limited. The created "folder" directories for example correspond to genres of content data, or users who own the client terminal 2.

One or more "album" directories are created under a "folder" directory. Specifically, the number of the "album" directories created under a "folder" directory is limited. Each "album" directory for example corresponds to an album title.

One or more "track" files are disposed under an "album" directory, so as to belong to the "album". Each "track" file corresponds to a piece of music, i.e., a content data.

The directory management of content data is performed based on data base files stored in the storage medium 29.

(1-3) Functional Circuit Block Configuration of Portal Server 3

Figure 4:
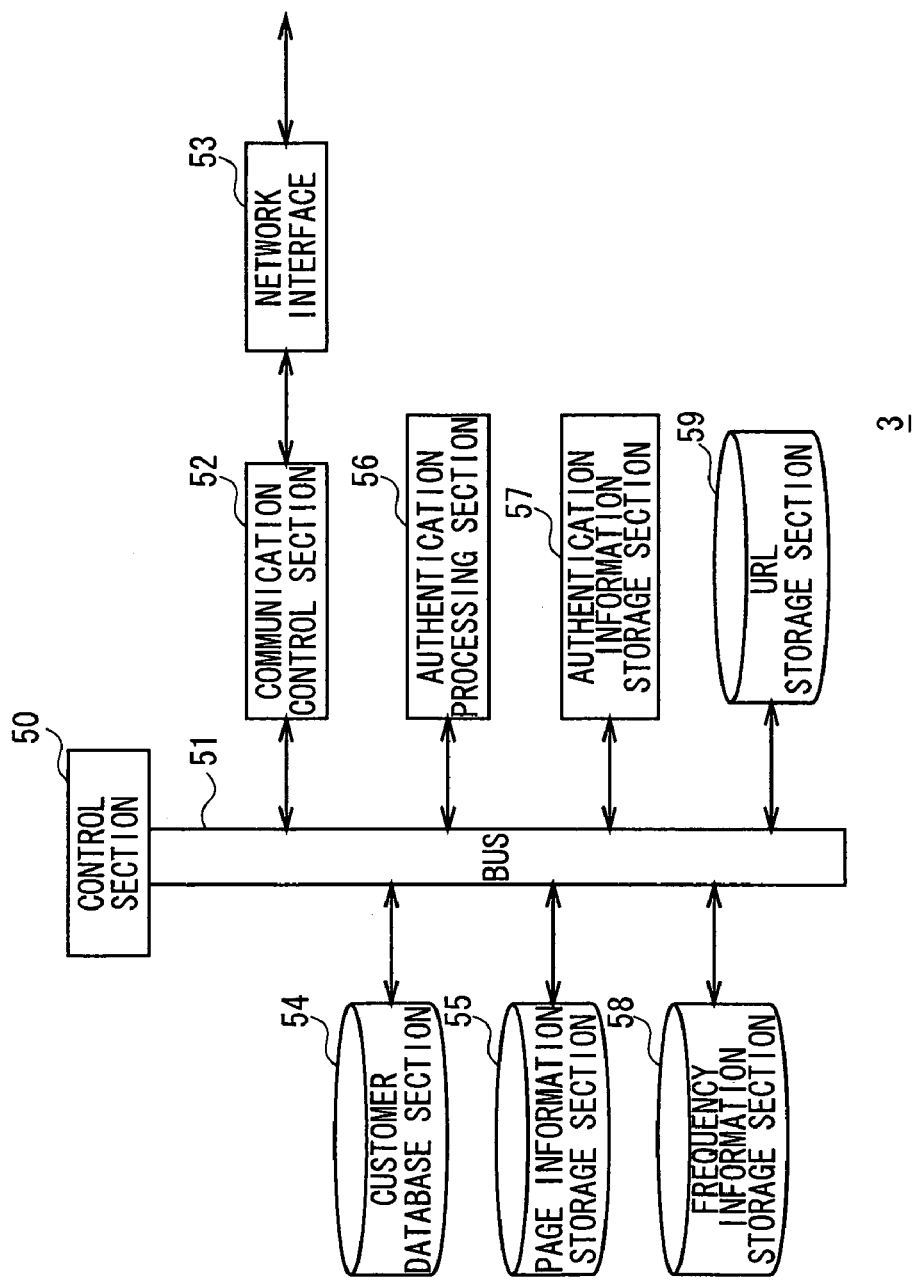
FIG. 4 is a block diagram showing the hardware configuration of a portal server using functional circuit blocks.

With reference to FIG. 4, the functional circuit block configuration of the portal server 3 will be described. The control section 50 of the portal server 3 controls operation of each circuit which is connected via a bus 51.

A communication control section 52 under the control of the control section 50 interchanges various kinds of information with the client terminal 2 and other servers SV1 through SV5 via a network interface 53.

A customer database section 54 stores a user's user Identification (ID) with its password information as customer information. The user is under contract with a company operating the music related service provision system 1.

A page information storage section 55 stores page information and the like. The page information is being managed by a company operating the music related service provision system 1.

The page information is described in the XML language or the like. The page information includes Uniform Resource Locators (URLs) for accessing the music data delivery server SV1, the sales server SV2, the radio broadcast information delivery server SV3, the Internet radio server SV4 and the like.

An authentication processing section 56 receives the user ID information and password information transmitted from the client terminal 2 via the network interface 53 and the communication control section 52 in order, and then performs user authentication processes. In the processes of user authentication, the authentication processing section 56 checks whether or not the received user ID information and password information are stored in the customer database section 54 as customer information.

After completing the user authentication processes, the authentication processing section 56 issues "portal authentication result information (equivalent to "authentication session ID information" described below)" showing the result of the user authentication process. The authentication processing section 56 then temporarily stores the portal authentication result information in an authentication information storage section 57.

If the result of the user authentication processes done by the authentication processing section 56 shows that the user is legitimate, the control section 50 transmits contractor's page information and portal authentication result information to the client terminal 2 via the communication control section 52 and the network interface 53 in order. The contractor's page information has been stored in a page information storage section 55.

If the result of the user authentication processes done by the authentication processing section 56 shows that the user is not legitimate, the control section 50 may transmit authentication error information and authentication failure notification page information to the client terminal 2 via the communication control section 52 and the network interface 53 in order. In this case, the authentication failure notification page information has been stored in the page information storage section 55, and showing the failure of authentication.

The client terminal 2 may obtain "portal authentication result information (equivalent to "authentication ticket" described below)" from the music data delivery server SV1, the sales server SV2 or the radio broadcast information delivery server SV3, after the music data delivery server SV1, the sales server SV2 or the radio broadcast information delivery server SV3 performs authentication processes for a user. In this case, the authentication processing section 56 receives the portal authentication result information from the user's client terminal 2 via the network interface 53 and the communication control section 52 in order, and compares it with the one which corresponds to the user and which is temporarily stored in the authentication information storage section 57.

That is to say, the authentication processing section 56 performs authentication processes for the portal authentication result information that the client terminal 2 received from the music data delivery server SV1, the sales server SV2 or the radio broadcast information delivery server SV3. In the authentication processes, the authentication processing section 56 performs a check process to check whether or not the received portal authentication result information is legitimate, and then transmits check result information showing the check result via the communication control section 52 and the network interface 53 to the music data delivery server SV1, the sales server SV2 or the radio broadcast information delivery server SV3.

A frequency information storage section 58 associates the followings together and stores them: a regional code identifying a region, such as a postal code; frequency information showing radio broadcast frequencies receivable in the region; a name of a radio station (which is also referred to as "radio station name") which broadcasts the radio programs; and a call sign which is unique to the radio station. The call sign is identification information to identify each radio station.

A URL storage section 59 associates each call sign with corresponding URL information, and stores them. The call sign is unique to each radio station which broadcasts radio programs. The URL information is utilized to acquire radio broadcast information. The radio broadcast information includes information relating to a radio program being broadcast from a radio station which corresponds to the associated call sign. The radio broadcast information for example includes a title of a radio program, an artist name and title of music being played in the radio program. The radio broadcast information is also referred to as "now-on-air information".

(1-4) Functional Circuit Block Configuration of Music Data Delivery Server SV1

Figure 5:
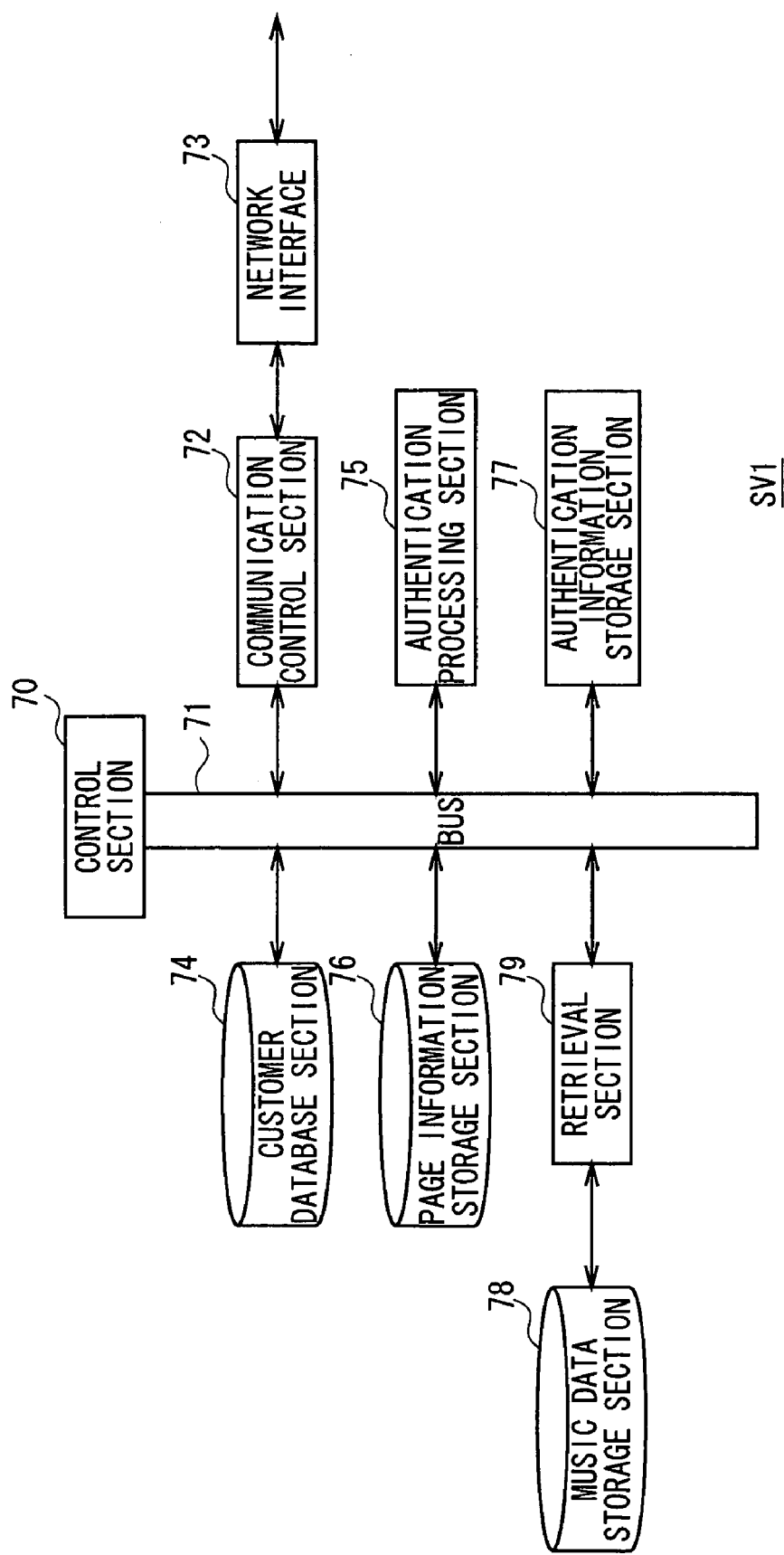
FIG. 5 is a block diagram showing the hardware configuration of a music data delivery server using functional circuit blocks.

With reference to FIG. 5, the functional circuit block configuration of the music data delivery server SV1 will be described. The control section 70 of the music data delivery server SV1 controls operation of each circuit which is connected via a bus 71.

A communication control section 72 under the control of the control section 70 interchanges various kinds of information and various kinds of data such as content data with the client terminal 2, the portal server 3, and the like via a network interface 73.

A customer database section 74 stores a user's user ID information with its password information as customer information. The user is under contract with a company operating the music related service provision system 1. By the way, an authentication processing section 75 may have functions to authenticate a user based on portal authentication result information (this information is issued by the portal server 3 to the client terminal 2 and transmitted from the client terminal 2 to the music data delivery server SV1). In this case, the customer database section 74 can be omitted.

A page information storage section 76 stores page information and the like. The page information is utilized for music data distribution, and presenting downloadable music data (this page information is also referred to as "music-data-distribution page information"). The page information is being managed by the music data delivery server SV1.

The music-data-distribution page information, described in the XML language or the like, has a structure in which a user of the client terminal 2 can select music data which the user wants to be downloaded.

When the client terminal 2 transmits a page information acquisition request signal which requests music-data-distribution page information, the control section 70 receives the page information acquisition request signal via the network interface 73 and the communication control section 72 in order. The control section 70 then transmits music-data-distribution page information stored in the page information storage section 76 to the client terminal 2 via the communication control section 72 and the network interface 73 in order, in response to the page information acquisition request signal.

When the client terminal 2 transmits its user's user ID information and password information, the authentication processing section 75 receives the user ID information and the password information via the network interface 73 and the communication control section 72 in order. The authentication processing section 75 then performs a user authentication process. In the user authentication process, the authentication processing section 75 checks whether or not the received user ID information and password information has been registered with the customer database section 74 as customer information.

The authentication processing section 75 may perform another user authentication process. This user authentication process is different from the one which uses user ID information and password information. In this case, the client terminal 2 transmits portal authentication result information (equivalent to an "authentication ticket" described below) issued by the portal server 3. The authentication processing section 75 receives the portal authentication result information via the network interface 73 and the communication control section 72 in order, and then transmits it to the portal server 3 via the communication control section 72 and the network interface 73 in order.

In this manner, the portal authentication result information is transmitted from the authentication processing section 75 to the portal server 3. The portal server 3 then performs authentication processes for the portal authentication result information (i.e. the check process described above), and then transmits check results information. The authentication processing section 75 receives the check results information via the network interface 73 and the communication control section 72 in order, and then checks whether or not the user is legitimate based on the check results information. In this case, a legitimate user means someone who has contracted with a company operating the music related service provision system 1.

When completing the user authentication process, the authentication processing section 75 issues server authentication result information (equivalent to a "service session ID information" described below). The server authentication result information shows the result of the user authentication process.

If the result of the user authentication process done by the authentication processing section 75 shows that the user is legitimate, the control section 70 transmits music-data-distribution page information and the server authentication result information to the client terminal 2 via the communication control section 72 and the network interface 73 in order. The music-data-distribution page information has been prepared for contractors, and stored in the page information storage section 76.

Whereas if the result of the user authentication process done by the authentication processing section 75 shows that the user is not legitimate, the control section 70 transmits authentication error information and authentication failure notification page information to the client terminal 2 via the communication control section 72 and the network interface 73 in order. In this case, the authentication failure notification page information has been stored in the page information storage section 76, and showing the failure of authentication.

An authentication information storage section 77 temporarily stores the server authentication result information issued by the authentication processing section 75. The authentication information storage section 77 also stores other authentication information which is necessary for the authentication processing section 75 to perform user authentication processes. In the user authentication process, a user of the client terminal 2 is authenticated.

A music data storage section 78 associates each compressed-coded music data with its retrieval key, and stores them. The music data has been compressed/coded by the ATRAC3, the MP3, or the like. The retrieval key is equivalent to content ID information and the like.

By the way, after the music-data-distribution page information is transmitted to the client terminal 2, the client terminal 2 may transmits a download request signal. The download request signal requests download of music data which a user wants to be downloaded, and includes a retrieval key for searching the music data. A retrieval section 79 receives the download request signal via the network interface 73 and the communication control section 72 in order, and obtains the retrieval key from it.

The retrieval section 79 then searches a plurality of music data stored in the music data storage section 78 for the music data which meet retrieval conditions shown in the retrieval key. That is to say, the retrieval section 79 searches for the music data which a user wants to be downloaded.

As a result, the control section 70 transmits the searched music data (which a user wants to be downloaded) to the client terminal 2 via the communication control section 72 and the network interface 73 in order.

At this time, the control section 70 transmits fee-charging information to the fee-charging server SV6 via the communication control section 72 and the network interface 73 in order. The fee-charging information is used for charging users a fee for the music data downloaded to the client terminal 2. The fee-charging server SV6 performs fee-charging processes for charging users a fee for the downloaded music data.

(1-5) Functional Circuit Block Configuration of Sales Server SV2

Figure 6:
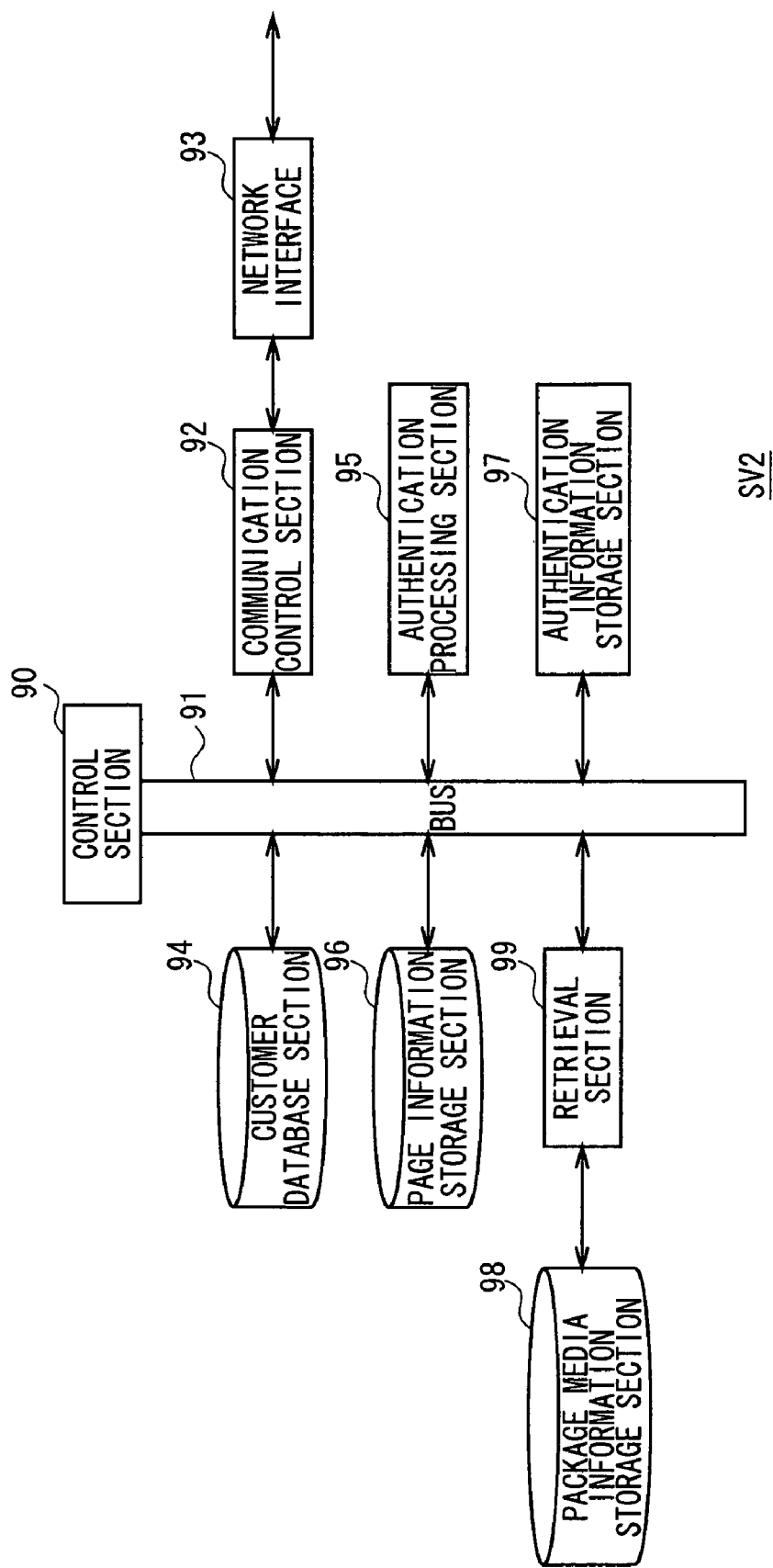
FIG. 6 is a block diagram showing the hardware configuration of a sales server using functional circuit blocks.

With reference to FIG. 6, the functional circuit block configuration of the sales server SV2 will be described. The control section 90 of the sales server SV2 controls operation of each circuit which is connected via a bus 91.

A communication control section 92 under the control of the control section 90 interchanges various kinds of information with the client terminal 2, the portal server 3, and the like via a network interface 93.

A customer database section 94 stores a user's user ID information with its password information as customer information. The user is under contract with a company operating the sales server SV2. By the way, an authentication processing section 95 may have functions to authenticate a user based on portal authentication result information (this information is issued by the portal server 3 to the client terminal 2 and transmitted from the client terminal 2 to the sales server SV2). In this case, the customer database section 94 can be omitted.

A page information storage section 96 stores page information and the like. The page information is utilized for sales of package media, and presenting package media such as CDs and DVDs for sale (this page information is also referred to as "package-media-sales page information"). The page information is being managed by the sales server SV2.

The package-media-sales page information, described in the XML language or the like, has a structure in which a user of the client terminal 2 can select package media such as CDs and DVDs which the user wants to buy.

When the client terminal 2 transmits a page information acquisition request signal which requests package-media-sales page information, the control section 90 receives the page information acquisition request signal via the network interface 93 and the communication control section 92 in order. The control section 90 then transmits package-media-sales page information stored in the page information storage section 96 to the client terminal 2 via the communication control section 92 and the network interface 93 in order, in response to the page information acquisition request signal.

When the client terminal 2 transmits its user's user ID information and password information, the authentication processing section 95 receives the user ID information and the password information via the network interface 93 and the communication control section 92 in order. The authentication processing section 95 then performs a user authentication process. In the user authentication process, the authentication processing section 95 checks whether or not the received user ID information and password information has been registered with the customer database section 94 as customer information.

The authentication processing section 95 may perform another user authentication process. This user authentication process is different from the one which uses user ID information and password information. In this case, the client terminal 2 transmits portal authentication result information (equivalent to an "authentication ticket" described below) issued by the portal server 3. The authentication processing section 95 receives the portal authentication result information via the network interface 93 and the communication control section 92 in order, and then transmits it to the portal server 3 via the communication control section 92 and the network interface 93 in order.

In this manner, the portal authentication result information is transmitted from the authentication processing section 95 to the portal server 3. The portal server 3 then performs authentication processes for the portal authentication result information (i.e. the check process described above), and then transmits check results information. The authentication processing section 95 receives the check results information via the network interface 93 and the communication control section 92 in order, and then checks whether or not the user is legitimate based on the check results information. In this case, a legitimate user means someone who has contracted with a company operating the music related service provision system 1.

When completing the user authentication process, the authentication processing section 95 issues server authentication result information (equivalent to a "service session ID information" described below). The server authentication result information shows the result of the user authentication process.

If the result of the user authentication process done by the authentication processing section 95 shows that the user is legitimate, the control section 90 transmits package-media-sales page information and the server authentication result information to the client terminal 2 via the communication control section 92 and the network interface 93 in order. The package-media-sales page information has been prepared for contractors, and stored in the page information storage section 96.

Whereas if the result of the user authentication process done by the authentication processing section 95 shows that the user is not legitimate, the control section 90 transmits authentication error information and authentication failure notification page information to the client terminal 2 via the communication control section 92 and the network interface 93 in order. In this case, the authentication failure notification page information has been stored in the page information storage section 96, and showing the failure of authentication.

An authentication information storage section 97 temporarily stores the server authentication result information issued by the authentication processing section 95. The authentication information storage section 97 also stores other authentication information which is necessary for the authentication processing section 95 to perform user authentication processes. In the user authentication process, a user of the client terminal 2 is authenticated.

A package media information storage section 98 associates each piece of package media information with a corresponding retrieval key, and stores them. Each piece of package media information relates to a package medium such as CD and DVD for sale. The retrieval key is equivalent to package medium ID information and the like.

By the way, after the package-media-sales page information is transmitted to the client terminal 2, the client terminal 2 may transmits a media information request signal. The media information request signal requests package media information relating to package media such as CDs and DVDs. A retrieval section 99 receives the media information request signal via the network interface 93 and the communication control section 92 in order, and obtains a retrieval key from it. The retrieval key is used for searching specific package media information.

The retrieval section 99 then searches a plurality of piece of package media information stored in the package media information storage section 98 for the piece of package media information which meets retrieval conditions shown in the retrieval key.

As a result, the control section 90 transmits the searched package media information to the client terminal 2 via the communication control section 92 and the network interface 93 in order, to show a user the package media information relating to a specific package medium.

When the client terminal 2 transmits a purchase request signal which requests the purchase of the package medium, the control section 90 receives the purchase request signal via the network interface 93 and the communication control section 92 in order, and then performs sale processes. In the sale processes, the control section 90 for example does shipping procedures to ship the package medium to a user of the client terminal 2.

At this time, the control section 90 transmits fee-charging information to the fee-charging server SV6 via the communication control section 92 and the network interface 93 in order. The fee-charging information is used for charging users a fee for the purchased package medium. The fee-charging server SV6 performs fee-charging processes to charge users a fee for the purchased package medium.

After the fee-charging server SV6 completes the fee-charging processes for the user, the control section 90 subsequently transmits sale completion page information to the client terminal 2 via the communication control section 92 and the network interface 93 in order. The sale completion page information shows that the sale process of the package medium has been completed.

(1-6) Functional Circuit Block Configuration of Radio Broadcast Information Delivery Server SV3

Figure 7:
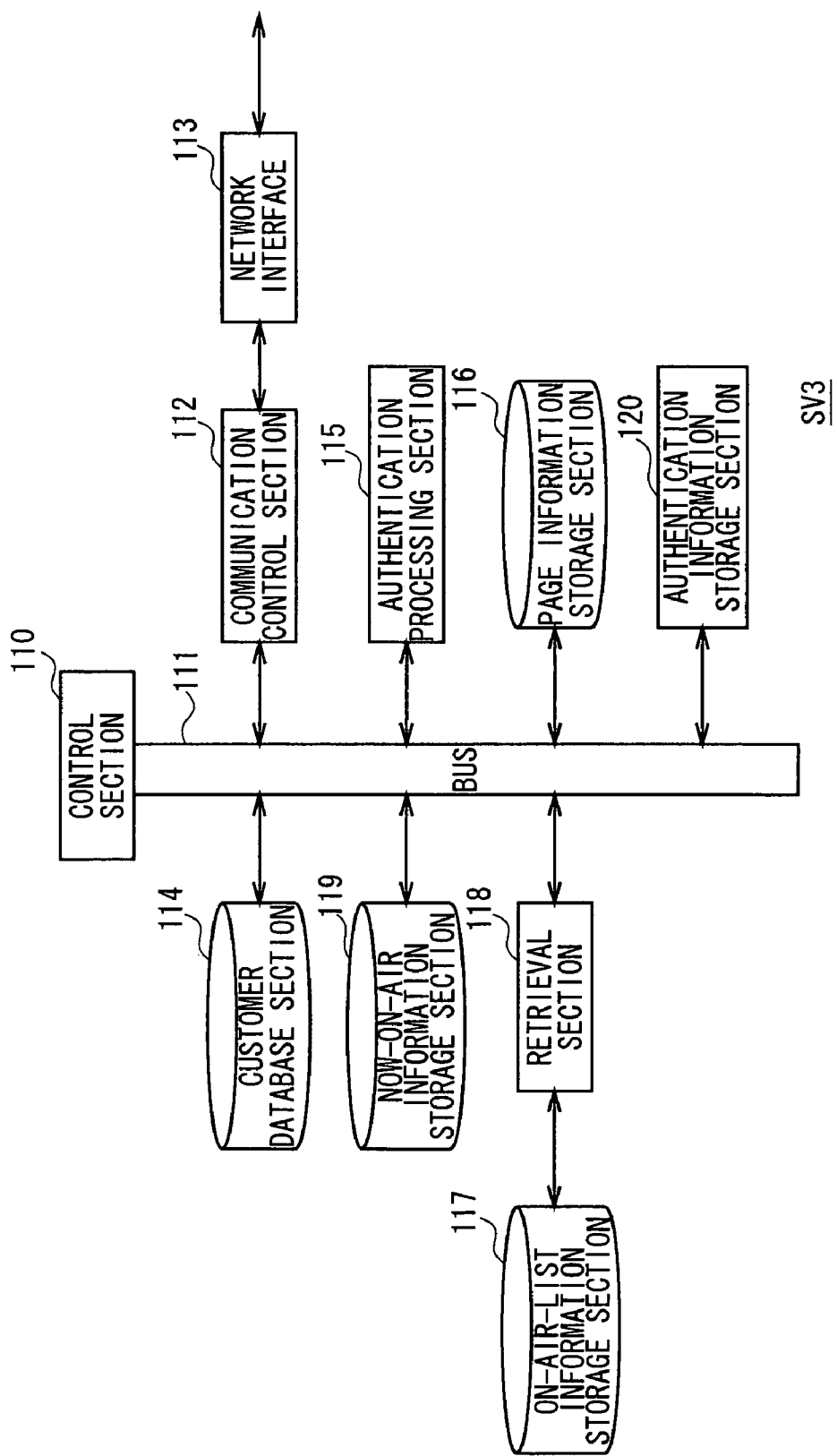
FIG. 7 is a block diagram showing the hardware configuration of a radio broadcast information delivery server using functional circuit blocks.

With reference to FIG. 7, the functional circuit block configuration of the radio broadcast information delivery server SV3 will be described. The control section 110 of the radio broadcast information delivery server SV3 controls operation of each circuit which is connected via a bus 111.

A communication control section 112 under the control of the control section 110 interchanges various kinds of information with the client terminal 2, the portal server 3, and the like via a network interface 113.

A customer database section 114 stores a user's user ID information with its password information as customer information. The user is under contract with a company operating the radio broadcast information delivery server SV3. By the way, an authentication processing section 115 may have functions to authenticate a user based on portal authentication result information (this information is issued by the portal server 3 to the client terminal 2 and transmitted from the client terminal 2 to the radio broadcast information delivery server SV3). In this case, the customer database section 114 can be omitted.

A page information storage section 116 stores page information and the like. The page information is used for acquisition of radio broadcast information. In this case, the radio broadcast information relates to radio programs which have already been broadcast from a radio station that corresponds to the radio broadcast information delivery server SV3. The radio broadcast information is also referred to as "on-air-list information", and the page information used for acquisition of on-air-list information is also referred to as "on-air-list-information-distribution page information". The page information is being managed by the radio broadcast information delivery server SV3.

The on-air-list-information-distribution page information, described in the XML language or the like, provides an input box and the like in which a user of the client terminal 2 can input retrieval keys of on-air-list information which the user wants to obtain. Radio program titles, the date and time of broadcast of the radio program, and the like could be the retrieval key.

An on-air-list information storage section 117 stores on-air-list information. The on-air-list information is generated by listing the following information: a title of a radio program which has already been broadcast from a radio station that corresponds to the radio broadcast information delivery server SV3; the start and end time of broadcast of the program; an artist name and title of music played in the program; the start time of broadcast of the music, and the like.

When the client terminal 2 transmits a page information acquisition request signal which requests on-air-list-information-distribution page information, the control section 110 receives the page information acquisition request signal via the network interface 113 and the communication control section 112 in order. The control section 110 then transmits on-air-list-information-distribution page information stored in the page information storage section 116 to the client terminal 2 via the communication control section 112 and the network interface 113 in order, in response to the page information acquisition request signal.

When a user input a retrieval key of on-air-list information which the user wants to obtain into the on-air-list-information-distribution page information, the client terminal 2 transmits an on-air-list information request signal which includes the retrieval key. The on-air-list information request signal requests the download of the on-air-list information. A retrieval section 118 receives the on-air-list information request signal via the network interface 113 and the communication control section 112 in order, and obtains the retrieval key from the on-air-list information request signal.

The retrieval section 118 then searches the whole on-air-list information stored in the on-air-list information storage section 117 based on the retrieval key to extract the part of on-air-list information which meets retrieval conditions shown in the retrieval key. In this manner, the part of on-air-list information which a user wants to acquire is obtained.

The control section 110 subsequently transmits the obtained on-air-list information to the client terminal 2 via the communication control section 112 and the network interface 113 in order.

A now-on-air information storage section 119 stores now-on-air information. The now-on-air information consists of the following information: a title of a radio program which is currently being broadcast from a radio station that corresponds to the radio broadcast information delivery server SV3; the start and end time of broadcast of the program; an artist name and title of music being currently played in the program; the start time of broadcast of the music, and the like.

When the client terminal 2 transmits its user's user ID information and password information with a now-on-air information request signal which requests now-on-air information, the authentication processing section 115 receives the user ID information and the password information via the network interface 113 and the communication control section 112 in order. The authentication processing section 115 then performs a user authentication process. In the user authentication process, the authentication processing section 115 checks whether or not the received user ID information and password information has been registered with the customer database section 114 as customer information.

The authentication processing section 115 may perform another user authentication process. This user authentication process is different from the one which uses user ID information and password information. In this case, the client terminal 2 transmits portal authentication result information (equivalent to an "authentication ticket" described below) issued by the portal server 3. The authentication processing section 115 receives the portal authentication result information via the network interface 113 and the communication control section 112 in order, and then transmits it to the portal server 3 via the communication control section 112 and the network interface 113 in order.

In this manner, the portal authentication result information is transmitted from the authentication processing section 115 to the portal server 3. The portal server 3 then performs authentication processes for the portal authentication result information (i.e. the check process described above), and then transmits check results information. The authentication processing section 115 receives the check results information via the network interface 113 and the communication control section 112 in order, and then checks whether or not the user is legitimate based on the check results information. In this case, a legitimate user means someone who has contracted with a company operating the music related service provision system 1.

When completing the user authentication process, the authentication processing section 115 issues server authentication result information (equivalent to a "service session ID information" described below). The server authentication result information shows the result of the user authentication process.

If the result of the user authentication process done by the authentication processing section 115 shows that the user is legitimate, the control section 110 transmits the server authentication result information and the now-on-air information stored in the now-on-air information storage section 119 to the client terminal 2 via the communication control section 112 and the network interface 113 in order.

Whereas if the result of the user authentication process done by the authentication processing section 115 shows that the user is not legitimate, the control section 110 transmits authentication error information and authentication failure notification page information to the client terminal 2 via the communication control section 112 and the network interface 113 in order. In this case, the authentication failure notification page information has been stored in the page information storage section 116, and showing the failure of authentication.

As described above, when the control section 110 receives a request for now-on-air information from a user, the control section 110 supplies now-on-air information, if the authentication result shows that the user is legitimate. Whereas if the authentication result shows that the user is not legitimate, the control section 110 does not provide radio broadcast information delivery services, i.e., it does not supply now-on-air information. The radio broadcast information delivery service is a service which is provided by the radio broadcast information delivery server SV3.

An authentication information storage section 120 temporarily stores the server authentication result information issued by the authentication processing section 115. The authentication information storage section 120 also stores other authentication information which is necessary for the authentication processing section 115 to perform user authentication processes. In the user authentication process, a user of the client terminal 2 is authenticated.

(1-7) Functional Circuit Block Configuration of CD Music Information Provision Server SV5

Figure 8:
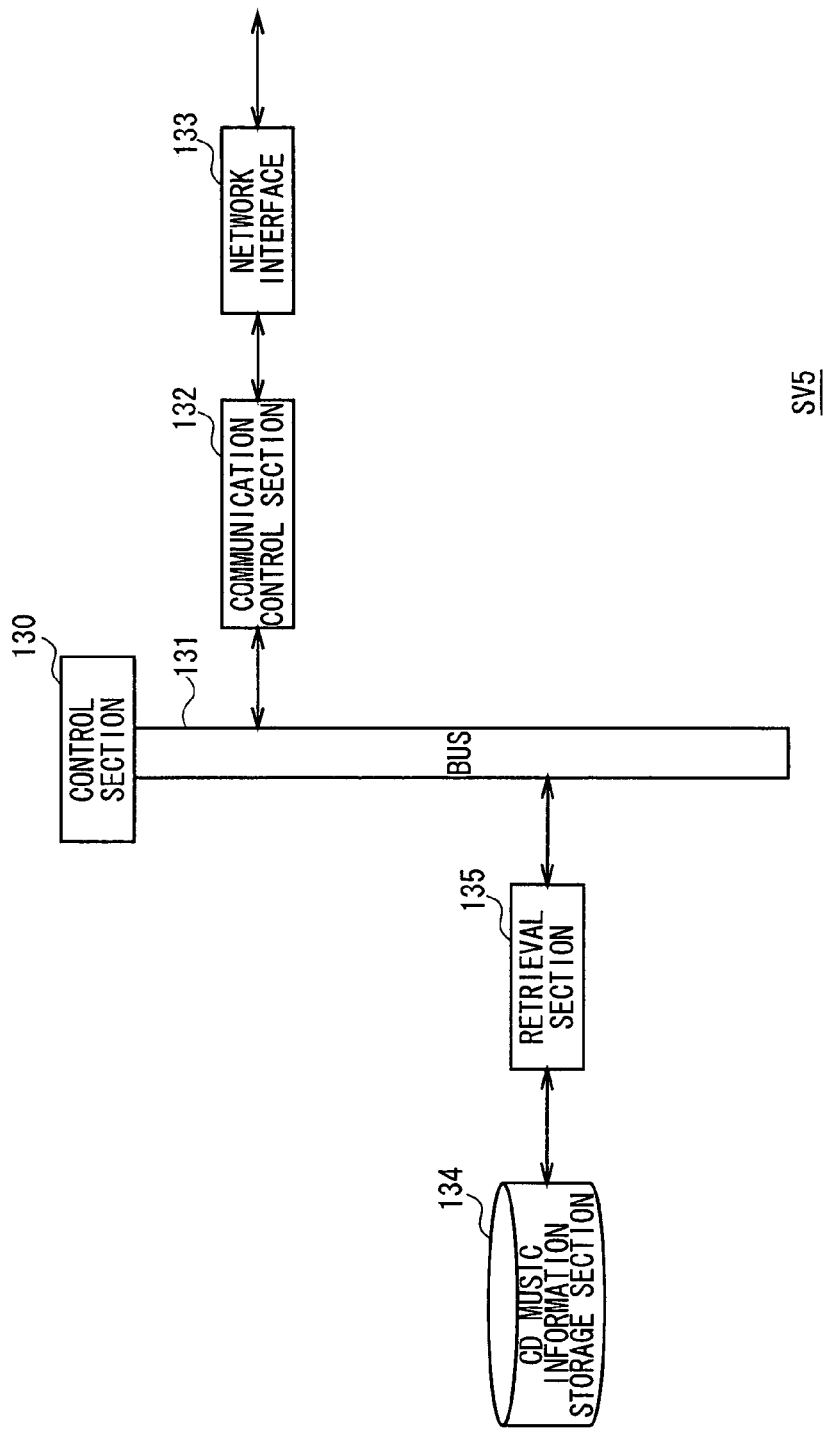
FIG. 8 is a block diagram showing the hardware configuration of a CD music information provision server using functional circuit blocks.

With reference to FIG. 8, the functional circuit block configuration of the CD music information provision server SV5 will be described. The control section 130 of the CD music information provision server SV5 controls operation of each circuit which is connected via a bus 131.

A communication control section 132 under the control of the control section 130 interchanges various kinds of information such as CD music information with the client terminal 2 and the like via a network interface 133.

A CD music information storage section 134 associates CD music information relating to a music CD for sale, with Table of Contents (TOC) information of the music CD, and stores and manages them. The CD music information includes a title of the music CD, titles of music stored in the music CD, an artist name, a genre, and the like.

When the client terminal 2 plays back a music CD, the client terminal 2 transmits a CD music information request signal including TOC information of the music CD. The retrieval section 135 receives the CD music information request signal via the network interface 133 and the communication control section 132 in order. Then the retrieval section 135 under the control of the control section 130 performs search processes using the TOC information in the CD music information request signal as a retrieval key, i.e., it searches the CD music information storage section 134 for the CD music information corresponding to the TOC information.

The control section 130 then transmits the CD music information searched by the retrieval section 135 to the client terminal 2 via the communication control section 132 and the network interface 133 in order.

As described above, the CD music information provision server SV5 is capable of providing the CD music information corresponding to a music CD being played by the client terminal 2 to the client terminal 2.

(1-8) Brief Overview of Processes of Each Server

With reference to sequence charts shown in FIG. 9 through FIG. 14, brief overview of processes between the client terminal 2 and the portal server 3 will be described. Also, brief overview of processes between the client terminal 2 and other servers such as the music data delivery server SV1, the sales server SV2, and the radio broadcast information delivery server SV3 will be described.

(1-8-1) User Authentication Process Between Client Terminal 2 and Portal Server 3

Figure 9:
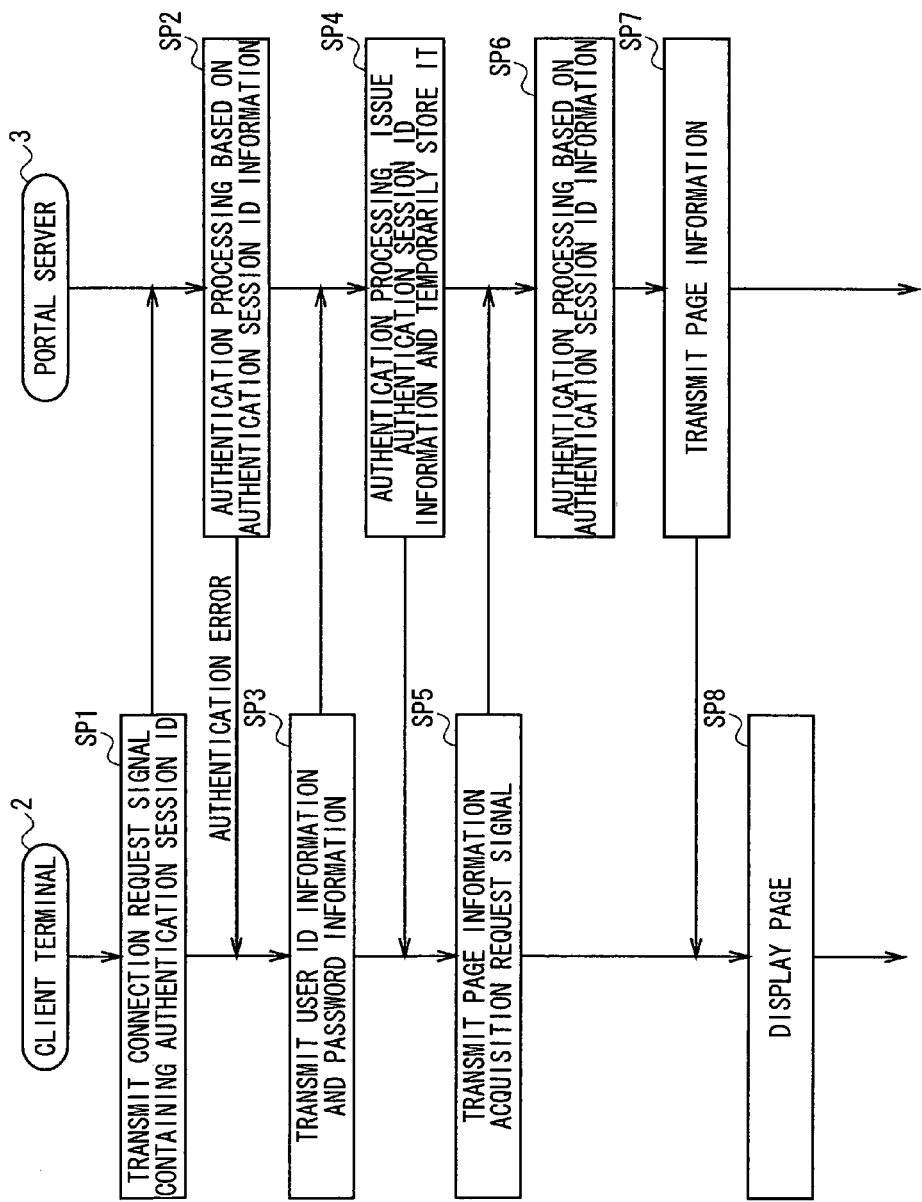
FIG. 9 is a sequence chart showing a user authentication process between the client terminal and the portal server.

With reference to FIG. 9, user authentication processes between the client terminal 2 and the portal server 3 will be described.

When a user under contract with a company operating the music related service provision system 1 operates the client terminal 2 to turn it on, the operation input section 20 of the client terminal 2 detects an operation input signal. Alternatively, when a user pushes a particular operation button of the operation input section 20, the operation input section 20 detects an operation input signal. The input processing section 21 converts the operation input signal to an operation command, and supplies it to the control section 23. The control section 23 therefore starts authentication request processes.

At step SP1, the control section 23 of the client terminal 2 which has started authentication request processes generates a connection request signal, and transmits the connection request signal to the portal server 3 via the communication control section 32 and the network interface 33 in order. The connection request signal contains authentication session ID information which was temporarily stored in the authentication information storage section 38, and the like.

The authentication session ID information is issued by the portal server 3 each time when the communication connection between the client terminal 2 and the portal server 3 is established to perform various kinds of processes such as the user authentication process. The authentication session ID information identifies each communication connection state (i.e., session).

The authentication session ID information has a certain period of validity for the user authentication processes and the like. The period of validity starts when the portal server 3 issues it. The period of validity for example is one minute.

In cases in which the client terminal 2 that already obtained authentication session ID information from the portal server 3 can not submit the authentication session ID information to the portal server 3 within the period of validity, the portal server 3 determines that the communication connection identified by the authentication session ID information has been broken.

In this manner, the portal server 3 prevents the issued authentication session ID information from being used improperly by someone who has not contracted with a company operating the music related service provision system 1 for the purpose of user authentication processes or the like.

In this case, the authentication information storage section 38 temporarily stores the authentication session ID information, which was issued by the portal server 3 when the communication connection between the client terminal 2 and the portal server 3 was established for the purpose of user authentication processes or the like at a time in the past.

When the client terminal 2 transmits connection request signal, the control section 50 of the portal server 3 receives the connection request signal via the network interface 53 and the communication control section 52 in order, at step SP2. The control section 50 then transmits authentication session ID information and the like in the connection request signal to the authentication processing section 56.

The authentication processing section 56 under the control of the control section 50 performs authentication processes based on the authentication session ID information and the like. This authentication session ID information was received as the connection request signal from the client terminal 2.

As a result, if the authentication processing section 56 determines that a user of the client terminal 2 is not legitimate, the control section 50 transmits authentication error information showing authentication error to the client terminal 2 via the communication control section 52 and the network interface 53 in order. In this case, the authentication processing section 56 determines that the user is not legitimate, when the authentication session ID information and the like received from the client terminal 2 have expired, or when there are other reasons.

At step SP3, the control section 23 of the client terminal 2 receives the authentication error information transmitted from the portal server 3 via the network interface 33 and the communication control section 32 in order. The control section 23 subsequently obtains user ID information, password information, and the like from the authentication information storage section 38, and then transmits the user ID information, the password information, and the like to the portal server 3 via the communication control section 32 and the network interface 33 in order.

At step SP4, the control section 50 of the portal server 3 receives the user ID information, the password information, and the like transmitted from the client terminal 2 via the network interface 53 and the communication control section 52 in order, and then supplies the user ID information, the password information, and the like to the authentication processing section 56.

The authentication processing section 56 under the control of the control section 50 performs user authentication processes. In the user authentication process, the authentication processing section 56 checks whether or not the user ID information, the password information, and the like received from the client terminal 2 exist in customer information registered with the customer database section 54.

As a result, if the authentication processing section 56 determines that a user of the client terminal 2 is legitimate, the authentication processing section 56 under the control of the control section 50 issues portal authentication result information for the client terminal 2. In this case, the portal authentication result information is equivalent to authentication session ID information which identifies the communication connection being maintained between the client terminal 2 and the portal server 3, and the like. The authentication processing section 56 then temporarily stores the issued authentication session ID information and the like in the authentication information storage section 57.

The control section 50 then transmits the authentication session ID information and the like to the client terminal 2 via the communication control section 52 and the network interface 53 in order. The authentication session ID information and the like were issued by the authentication processing section 56 for the client terminal 2.

At step SP5, the control section 23 of the client terminal 2 receives the authentication session ID information and the like transmitted from the portal server 3 via the network interface 33 and the communication control section 32 in order, and then supplies the authentication session ID information and the like to the authentication processing section 37.

The authentication processing section 37 under the control of the control section 23 temporarily stores the authentication session ID information and the like received from the portal server 3 in the authentication information storage section 38.

The control section 23 then transmits a page information acquisition request signal with the authentication session ID information and the like (which were received from the portal server 3 and temporarily stored in the authentication information storage section 38) to the portal server 3 via the communication control section 32 and the network interface 33 in order. The page information acquisition request signal requests page information from the portal server 3.

At step SP6, the control section 50 of the portal server 3 receives the page information acquisition request signal, the authentication session ID information, and the like transmitted from the client terminal 2 via the network interface 53 and the communication control section 52 in order, and then supplies the authentication session ID information, and the like to the authentication processing section 56.

The authentication processing section 56 under the control of the control section 50 then performs user authentication processes. In the user authentication process, the authentication processing section 56 compares the authentication session ID information and the like received from the client terminal 2 with the ones temporarily stored in the authentication information storage section 57. The information temporarily stored in the authentication information storage section 57 was issued for the client terminal 2 at step SP4.

At step SP7, if the authentication result shows that a user of the client terminal 2 is legitimate, the authentication processing section 56 determines that the request for page information received from the client terminal 2 is legitimate. The authentication processing section 56 then extends the period of validity of authentication session ID information and the like.

The control section 50 therefore reads the page information requested by a user from the page information storage section 55, and transmits the page information, the authentication session ID information, and the like to the client terminal 2 via the communication control section 52 and the network interface 53 in order. The authentication session ID information and the like have their period of validity extended by the authentication processing section 56.

At step SP8, the control section 23 of the client terminal 2 receives the page information, authentication session ID information and the like transmitted from the portal server 3 via the network interface 33 and the communication control section 32 in order. The authentication session ID information and the like have their period of validity extended. The control section 23 of the client terminal 2 then supplies the page information to the page information generation section 36. The control section 23 of the client terminal 2 also supplies the authentication session ID information and the like to the authentication processing section 37.

The page information generation section 36 generates video data of page based on the page information supplied from the control section 23. The video data of page contains links to the music data delivery server SV1, the sales server SV2, and the radio broadcast information delivery server SV3. The page information generation section 36 subsequently supplies the video data to the display control section 24.

The display control section 24 performs digital-to-analog conversion for the video data supplied from the page information generation section 36 to generate analog video signals. The display control section 24 then supplies the analog video signals to the display section 25 which displays images of page of the portal server 3 based on the analog video signals.

The authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have the period of validity extended. In this manner, the authentication session ID information and the like temporarily stored by the above-noted step SP5 are updated to the ones having their period of validity extended.

(1-8-2) User Authentication Process Between Client Terminal 2 and Servers SV1 Through SV3

Figure 10:
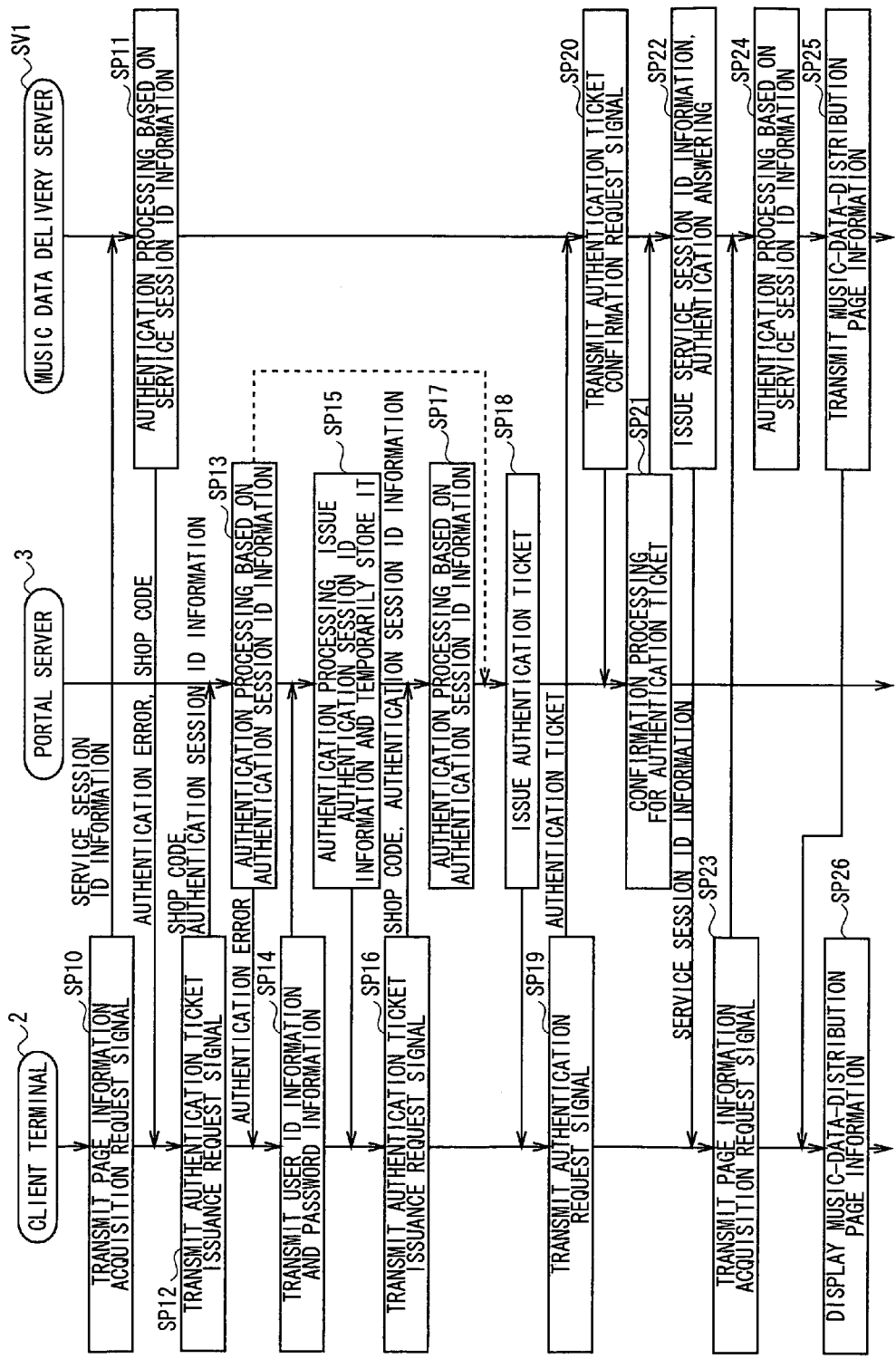
FIG. 10 is a sequence chart showing a user authentication process between the client terminal and the music data delivery server.

With reference to FIG. 10, user authentication processes will be described. The user authentication process is executed between the client terminal 2 and the music data delivery server SV1, the sales server SV2, or the radio broadcast information delivery server SV3.

The user authentication process may be executed after the client terminal 2 obtains page information from the portal server 3 as described above (FIG. 9). In this case, the user authentication process is executed, when the client terminal 2 accesses the music data delivery server SV1, the sales server SV2, or the radio broadcast information delivery server SV3 based on links embedded in the page information. This user authentication process is also referred to as an "indirect access authentication process".

The user authentication process may be executed when the client terminal 2 directly accesses the music data delivery server SV1, the sales server SV2, or the radio broadcast information delivery server SV3 based on URL information and the like previously bookmarked (registered). In this case, the client terminal 2 does not have to obtain page information from the portal server 3. This user authentication process is also referred to as a "direct access authentication process".

The indirect access authentication process can be executed in any combination of the following: the client terminal 2 and the music data delivery server SV1; the client terminal 2 and the sales server SV2; and, the client terminal 2 and the radio broadcast information delivery server SV3.

The direct access authentication process also can be executed in any combination of the following: the client terminal 2 and the music data delivery server SV1; the client terminal 2 and the sales server SV2; and, the client terminal 2 and the radio broadcast information delivery server SV3.

The only difference between the indirect access authentication process and the direct access authentication process is the way to obtain URL information which the client terminal 2 uses to access the music data delivery server SV1, the sales server SV2, and the radio broadcast information delivery server SV3. The indirect access authentication process and the direct access authentication process perform the same procedures after obtaining the URL information.

Accordingly, the situation in which the client terminal 2 accesses the music data delivery serve SV1 will be described to avoid repeatedly explaining. Both the indirect access authentication process and the direct access authentication process will be collectively described as a user authentication process.

At step SP10, the control section 23 of the client terminal 2 transmits a page information acquisition request signal, service session ID information read from the authentication information storage section 38, and the like to the music data delivery server SV1 via the communication control section 32 and the network interface 33 in order. At this time, the control section 23 of the client terminal 2 uses URL information which is embedded in page information as links, or which is previously bookmarked (registered). The page information acquisition request signal requests music-data-distribution page information (if the client terminal 2 accesses the sales server SV2 or the radio broadcast information delivery server SV3, the page information acquisition request signal requests package-media-sales page information or on-air-list-information-distribution page information).

Each time when the communication connection between the client terminal 2 and the music data delivery server SV1, the sales server SV2 or the radio broadcast information delivery server SV3 is established to perform various kinds of processes such as the user authentication process, the service session ID information is issued by the connected server SV1, SV2 or SV3. The service session ID information identifies each communication connection state (i.e., session).

The service session ID information has a certain period of validity for the user authentication processes and the like, in the same way as the above-noted authentication session ID information. The period of validity starts when the music data delivery server SV1, the sales server SV2 or the radio broadcast information delivery server SV3 issues it. The period of validity for example is one minute.

In cases in which the client terminal 2 that already has service session ID information issued by the server SV1, SV2 or SV3 can not submit the service session ID information to the issued server SV1, SV2 or SV3 within the period of validity, the issued server SV1, SV2 or SV3 determines that the communication connection identified by the service session ID information has been broken.

In this manner, the music data delivery server SV1, the sales server SV2 or the radio broadcast information delivery server SV3 prevents the issued authentication session ID information from being used improperly by someone who has not contracted with a company operating the music related service provision system 1 for the purpose of user authentication processes or the like.

In this case, the authentication information storage section 38 temporarily stores the service session ID information, which was issued by the music data delivery server SV1, the sales server SV2 or the radio broadcast information delivery server SV3 when the communication connection between the client terminal 2 and the server SV1, SV2 or SV3 was established for the purpose of user authentication processes or the like at a time in the past.

At step SP11, the control section 70 of the music data delivery server SV1 receives the page information acquisition request signal, service session ID information, and the like transmitted by the client terminal 2 via the network interface 73 and the communication control section 72 in order. The control section 70 of the music data delivery server SV1 then supplies the service session ID information and the like to the authentication processing section 75.

The authentication processing section 75 under the control of the control section 70 performs user authentication processes. In the user authentication process, the authentication processing section 75 compares the service session ID information and the like received from client terminal 2 with the ones temporarily stored in the authentication information storage section 77.

As a result, if the authentication result shows that a user of the client terminal 2 is not legitimate, the authentication processing section 75 determines that the request for music-data-distribution page information received from the client terminal 2 is not legitimate. For example, the authentication result shows that a user of the client terminal 2 is not legitimate, when the service session ID information received from the client terminal 2 has expired.

The control section 70 subsequently transmits authentication error information showing authentication error, and a shop code identifying the music data delivery server SV1 to the client terminal 2 via the communication control section 72 and the network interface 73 in order, because the authentication processing section 75 determines that a user of the client terminal 2 is not legitimate.

At step SP12, the control section 23 of the client terminal 2 receives the authentication error information and shop code transmitted from the music data delivery server SV1 via the network interface 33 and the communication control section 32 in order. The control section 23 of the client terminal 2 then recognizes that the user is not authenticated as legitimate based on the authentication error information, and temporarily stores the shop code received from the music data delivery server SV1 in the authentication information storage section 38.

The control section 23 subsequently generates an authentication ticket issuance request signal. The authentication ticket issuance request signal requests the issue of an authentication ticket which is used for accessing the music data delivery server SV1. The control section 23 then transmits the authentication ticket issuance request signal, a shop code of the music data delivery server SV1, authentication session ID information temporarily stored in the authentication information storage section 38, and the like to the portal server 3 via the communication control section 32 and the network interface 33 in order.

At step SP13, the control section 50 of the portal server 3 receives the authentication ticket issuance request signal, shop code, authentication session ID information, and the like transmitted from the client terminal 2 via the network interface 53 and the communication control section 52 in order, and supplies them to the authentication processing section 56.

The authentication processing section 56 under the control of the control section 50 performs user authentication processes. In the user authentication process, the authentication processing section 56 compares the authentication session ID information and the like received from the client terminal 2 with the ones temporarily stored in the authentication information storage section 57.

As a result, the authentication result shows that a user of the client terminal 2 is not legitimate, the authentication processing section 56 determines that the request for authentication ticket received from the client terminal 2 is not legitimate. For example, the authentication result shows that a user of the client terminal 2 is not legitimate, when the authentication session ID information received from the client terminal 2 has expired.

The control section 50 subsequently transmits authentication error information showing authentication error to the client terminal 2 via the communication control section 52 and the network interface 53 in order, because the authentication processing section 56 determines that a user of the client terminal 2 is not legitimate.

Whereas if the authentication result shows that a user of the client terminal 2 is legitimate, the authentication processing section 56 determines that the request for authentication ticket received from the client terminal 2 is legitimate. For example, the authentication result shows that a user of the client terminal 2 is legitimate, when the authentication session ID information received from the client terminal 2 has not expired.

In cases in which the authentication result by the authentication processing section 56 shows that a user of the client terminal 2 is legitimate, the control section 50 proceeds to step SP18 which is described below.

At step SP14, the control section 23 of the client terminal 2 receives the authentication error information transmitted from the portal server 3 via the network interface 33 and the communication control section 32 in order. The control section 23 of the client terminal 2 then reads user ID information, password information and the like from the authentication information storage section 38, and transmits the user ID information, the password information and the like to the portal server 3 via the communication control section 32 and the network interface 33 in order.

At step SP15, the control section 50 of the portal server 3 receives the user ID information, password information and the like transmitted from the client terminal 2 via the network interface 53 and the communication control section 52 in order, and supplies the user ID information, the password information and the like to the authentication processing section 56.

Therefore, the authentication processing section 56 under the control of the control section 50 performs user authentication processes. In the user authentication process, the authentication processing section 56 checks whether or not the user ID information, password information and the like received from the client terminal 2 exists in customer information registered with the customer database section 54.

As a result, if the authentication result shows that a user of the client terminal 2 is legitimate, the authentication processing section 56 under the control of the control section 50 issues authentication session ID information (portal authentication result information) for the communication connection being currently maintained between the client terminal 2 and the portal server 3, and the like. The authentication processing section 56 then temporarily stores the authentication session ID information and the like issued to the client terminal 2 in the authentication information storage section 57.

The control section 50 subsequently transmits the authentication session ID information and the like issued to the client terminal 2 by the authentication processing section 56 to the client terminal 2 via the communication control section 52 and the network interface 53 in order.

At step SP16, the control section 23 of the client terminal 2 receives the authentication session ID information and the like transmitted from the portal server 3 via the network interface 33 and the communication control section 32 in order, and temporarily stores the authentication session ID information and the like in the authentication information storage section 38 using the authentication processing section 37.

The control section 23 then regenerate an authentication ticket issuance request signal which requests the issue of authentication tickets. The control section 23 subsequently transmits the authentication ticket issuance request signal, the shop code temporarily stored in the authentication information storage section 38, the authentication session ID information and the like being temporarily stored, to the portal server 3 via the communication control section 32 and the network interface 33 in order.

In the present embodiment, the client terminal 2 temporarily stores the shop code in the authentication information storage section 38. However, this invention is not limited to this. The client terminal 2 may interchange again the shop code with the portal server 3 while performing the steps of SP12 through SP16. This allows the client terminal 2 to transmit the shop code to the portal server 3 at step SP16 without temporarily storing it in the authentication information storage section 38.

At step SP17, the control section 50 of the portal server 3 receives the authentication ticket issuance request signal, shop code, authentication session ID information and the like transmitted from the client terminal 2 via the network interface 53 and the communication control section 52 in order, and supplies them to the authentication processing section 56.

The authentication processing section 56 under the control of the control section 50 performs user authentication processes. In the user authentication process, the authentication processing section 56 compares the authentication session ID information and the like received from the client terminal 2 with the ones temporarily stored in the authentication information storage section 57.

If the authentication result shows that a user of the client terminal 2 is legitimate, the authentication processing section 56 determines that the request for authentication tickets received from the client terminal 2 is legitimate. For example, the authentication result shows that a user of the client terminal 2 is legitimate, when the authentication session ID information and the like received from the client terminal 2 have not expired yet.

Then, the control section 50 proceeds to step SP18, as a user of the client terminal 2 is authenticated as legitimate by the authentication processing section 56.

At step SP18, the authentication processing section 56 under the control of the control section 50 issues an authentication ticket (portal authentication result information) and the like based on the shop code and authentication ticket issuance request signal received from the client terminal 2 by the above-noted step SP17. The authentication ticket allows the client terminal 2 to access the music data delivery server SV1 which corresponds to the shop code.

The authentication processing section 56 under the control of the control section 50 temporarily stores the issued authentication ticket and the like in the authentication information storage section 57, and extends the period of validity of authentication session ID information and the like issued to the client terminal 2.

The control section 50 then transmits the authentication ticket, the authentication session ID information having its period of validity extended by the authentication processing section 56, and the like to the client terminal 2 via the communication control section 52 and the network interface 53 in order.

At step SP19, the control section 23 of the client terminal 2 receives the authentication ticket, authentication session ID information having its period of validity extended, and the like transmitted from the portal server 3 via the network interface 33 and the communication control section 32 in order, and supplies the authentication session ID information to the authentication processing section 37.

The control section 23 transmits the authentication ticket received from the portal server 3, an authentication request signal, and the like to the music data delivery server SV1 via the communication control section 32 and the network interface 33 in order.

At this time, the authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have the period of validity extended. In this manner, the authentication session ID information and the like temporarily stored by the above-noted step SP16 are updated to the ones having their period of validity extended.

At step SP20, the control section 70 of the music data delivery server SV1 receives the authentication request signal, authentication ticket and the like transmitted from the client terminal 2 via the network interface 73 and the communication control section 72 in order.

The control section 70 then transmits the authentication ticket received from the client terminal 2, an authentication ticket confirmation request signal which requests the confirmation of the authentication ticket, and the like to the portal server 3 via the communication control section 72 and the network interface 73 in order.

At step SP21, the control section 50 of the portal server 3 receives the authentication ticket confirmation request signal, authentication ticket, and the like transmitted from the music data delivery server SV1 via the network interface 53 and the communication control section 52 in order. The control section 50 of the portal server 3 then supplies the authentication ticket confirmation request signal, authentication ticket, and the like to the authentication processing section 56.

In response to the authentication ticket confirmation request signal, the authentication processing section 56 under the control of the control section 50 performs confirmation processes to confirm the authentication ticket received from the music data delivery server SV1. In the confirmation process, the authentication processing section 56 compares the authentication ticket and the like received from the music data delivery server SV1 with the ones temporarily stored in the authentication information storage section 57.

If the confirmation result shows that the authentication ticket and the like received from the music data delivery server SV1 are legitimate, the control section 50 transmits confirmation result information to the music data delivery server SV1 via the communication control section 52 and the network interface 53 in order, the confirmation result information showing that the authentication ticket and the like are legitimate.

At step SP22, the control section 70 of the music data delivery server SV1 receives the confirmation result information transmitted from the portal server 3 via the network interface 73 and the communication control section 72 in order, and supplies the confirmation result information to the authentication processing section 75.

In response to the confirmation result information, the authentication processing section 75 under the control of the control section 70 issues service session ID information (server authentication result information) for the communication connection being currently maintained between the client terminal 2 and the music data delivery server SV1, and the like. The authentication processing section 75 then temporarily stores the issued service session ID information and the like in the authentication information storage section 77.

The control section 70 transmits the service session ID information and the like issued to the client terminal 2 by the authentication processing section 75 to the client terminal 2 via the communication control section 72 and the network interface 73 in order.

At step SP23, the control section 23 of the client terminal 2 receives the service session ID information and the like transmitted from the music data delivery server SV1 via the network interface 33 and the communication control section 32 in order, and temporarily stores the service session ID information and the like in the authentication information storage section 38 using the authentication processing section 37.

Therefore, the control section 23 transmits a page information acquisition request signal which requests music-data-distribution page information, the service session ID information and the like to the music data delivery server SV1 via the communication control section 32 and the network interface 33 in order. The service session ID information was received from the music data delivery server SV1 and temporarily stored in the authentication information storage section 38.

At step SP24, the control section 70 of the music data delivery server SV1 receives the page information acquisition request signal, service session ID information and the like transmitted from the client terminal 2 via the network interface 73 and the communication control section 72 in order, and supplies the service session ID information and the like to the authentication processing section 75.

The authentication processing section 75 under the control of the control section 70 performs user authentication processes. In the user authentication process, the authentication processing section 75 compares the service session ID information and the like received from the client terminal 2 with the ones temporarily stored in the authentication information storage section 77. The information temporarily stored in the authentication information storage section 77 was issued to the client terminal 2 by the above-noted step SP22.

If the authentication result shows that a user of the client terminal 2 is legitimate, the authentication processing section 75 determines that the request for music-data-distribution page information received from the client terminal 2 is legitimate. For example, the authentication result shows that a user of the client terminal 2 is legitimate, when the service session ID information and the like received from the client terminal 2 have not expired yet.

Then, the control section 70 proceeds to step SP25, as a user of the client terminal 2 is authenticated as legitimate by the authentication processing section 75.

At step SP25, the control section 70 reads the music-data-distribution page information which is requested by a user from the page information storage section 76. The control section 70 also extends the period of validity of the service session ID information and the like issued to the client terminal 2 using the authentication processing section 75.

The control section 70 subsequently transmits the music-data-distribution page information read from the page information storage section 76, the service session ID information having its period of validity extended by the authentication processing section 75, and the like to the client terminal 2 via the communication control section 72 and the network interface 73 in order.

At step SP26, the control section 23 of the client terminal 2 receives the music-data-distribution page information, the service session ID information having its period of validity extended, and the like transmitted from the music data delivery server SV1 via the network interface 33 and the communication control section 32 in order. The control section 23 of the client terminal 2 then supplies the music-data-distribution page information to the page information generation section 36. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like which have their period of validity extended were received from the music data delivery server SV1. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored by the above-noted step SP23 are updated to the ones having their period of validity extended.

The page information generation section 36 generates video data based on the music-data-distribution page information, and supplies the video data to the display control section 24.

The display control section 24 performs digital-to-analog conversion for the video data supplied from the page information generation section 36 to generate analog video signals. The display control section 24 then supplies the analog video signals to the display section 25. The display section 25 displays images of the music-data-distribution page based on the analog video signals.

(1-8-3) Music Related Service Provision Processes

After completing the user authentication process (FIG. 10) between the client terminal 2 and the music data delivery server SV1 or the sales server SV2 or the radio broadcast information delivery server SV3, the music related service provision process is executed. With reference to FIG. 11 through FIG. 14, the music related service provision process will be described in the following situation: the client terminal 2 receives music data distribution services using music-data-distribution page information obtained during the user authentication processing from the music data delivery server SV1; the client terminal 2 receives sales services using package-media-sales page information obtained during the user authentication processing from the sales server SV2; and the client terminal 2 receives radio broadcast information distribution services using on-air-list-information-distribution page information obtained during the user authentication processing from the radio broadcast information delivery server SV3.

(1-8-3-1) Music Data Distribution Service Provision Process

Figure 11:
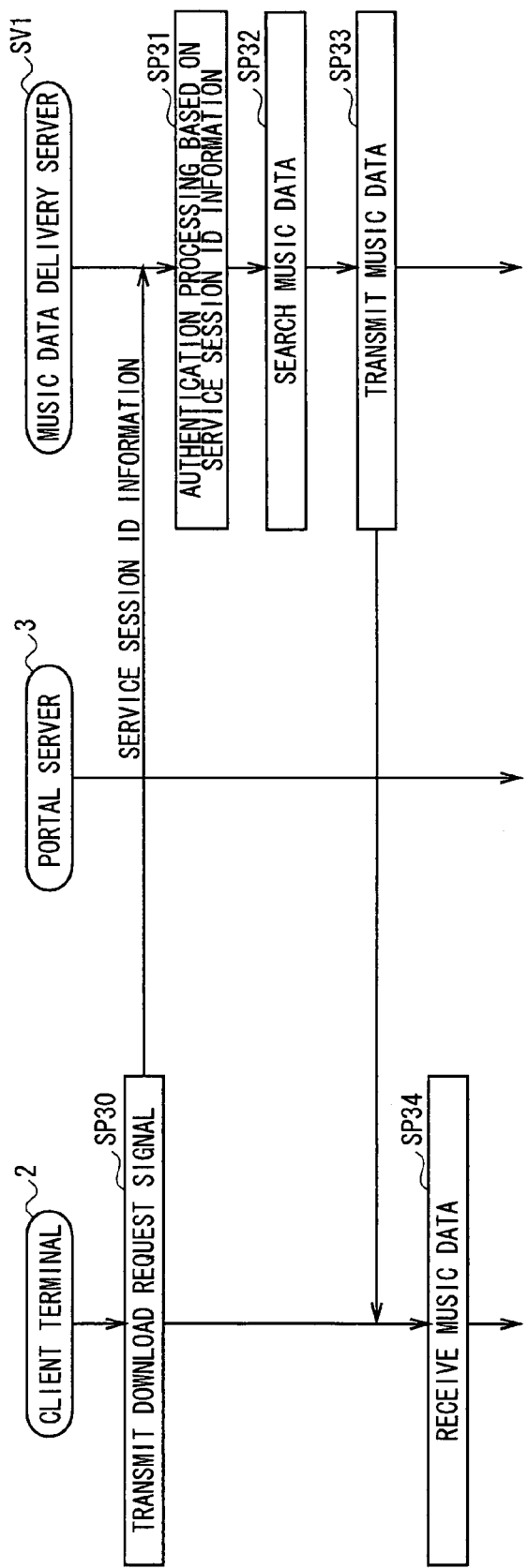
FIG. 11 is a sequence chart showing a music data distribution service provision process.

With reference to FIG. 11, the music data distribution service provision process will be described. In the music data distribution service provision process, the client terminal 2 receives the music data distribution service from the music data delivery server SV1.

At step SP30, if control commands which select a part of the music-data-distribution page displayed as images on the display section 25 are input from the input processing section 21, the control section 23 of the client terminal 2 generates a download request signal. The download request signal requests the download of music data which a user wants to be downloaded.

The control section 23 then transmits the download request signal, the service session ID information, and the like to the music data delivery server SV1 via the communication control section 32 and the network interface 33 in order. The service session ID information was issued by the music data delivery server SV1 and temporarily stored in the authentication information storage section 38.

At step SP31, the control section 70 of the music data delivery server SV1 receives the download request signal, service session ID information and the like transmitted from the client terminal 2 via the network interface 73 and the communication control section 72 in order, and supplies the service session ID information and the like to the authentication processing section 75.

The authentication processing section 75 under the control of the control section 70 performs user authentication processes. In the user authentication process, the authentication processing section 75 compares the service session ID information and the like received from the client terminal 2 with the ones temporarily stored in the authentication information storage section 77.

If the authentication processing section 75 authenticates that a user is legitimate, the control section 70 proceeds to step SP32. In this case, the user has requested the download of music data using the client terminal 2.

At step SP32, the retrieval section 79 performs search processes based on a retrieval key in the download request signal. In the search process, the retrieval section 79 searches a plurality of music data stored in the music data storage section 78 for the music data corresponding to the retrieval conditions shown in the retrieval key, which a user wants to be downloaded.

When the retrieval section 79 has the music data found, the control section 70 extends the period of validity of the service session ID information and the like issued to the client terminal 2 using the authentication processing section 75, and then proceeds to step SP33.

At step SP33, the control section 70 reads the music data (which a user wants to be downloaded) found by the retrieval section 79 from the music data storage section 78. The control section 70 then transmits the music data, the service session ID information having its period of validity extended by the authentication processing section 75, and the like to the client terminal 2 via the communication control section 72 and the network interface 73 in order.

At step SP34, the control section 23 of the client terminal 2 receives the music data (which a user wants to be downloaded), the service session ID information having its period of validity extended, and the like transmitted from the music data delivery server SV1 via the network interface 33 and the communication control section 32 in order. The control section 23 of the client terminal 2 then stores the music data in the storage medium 29. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like which have their period of validity extended were received from the music data delivery server SV1. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

As described above, the client terminal 2 is capable of downloading the music data which a user wants to obtain using music data distribution services provided by the music data delivery server SV1.

(1-8-3-2) Sales Service Provision Process

Figure 12:
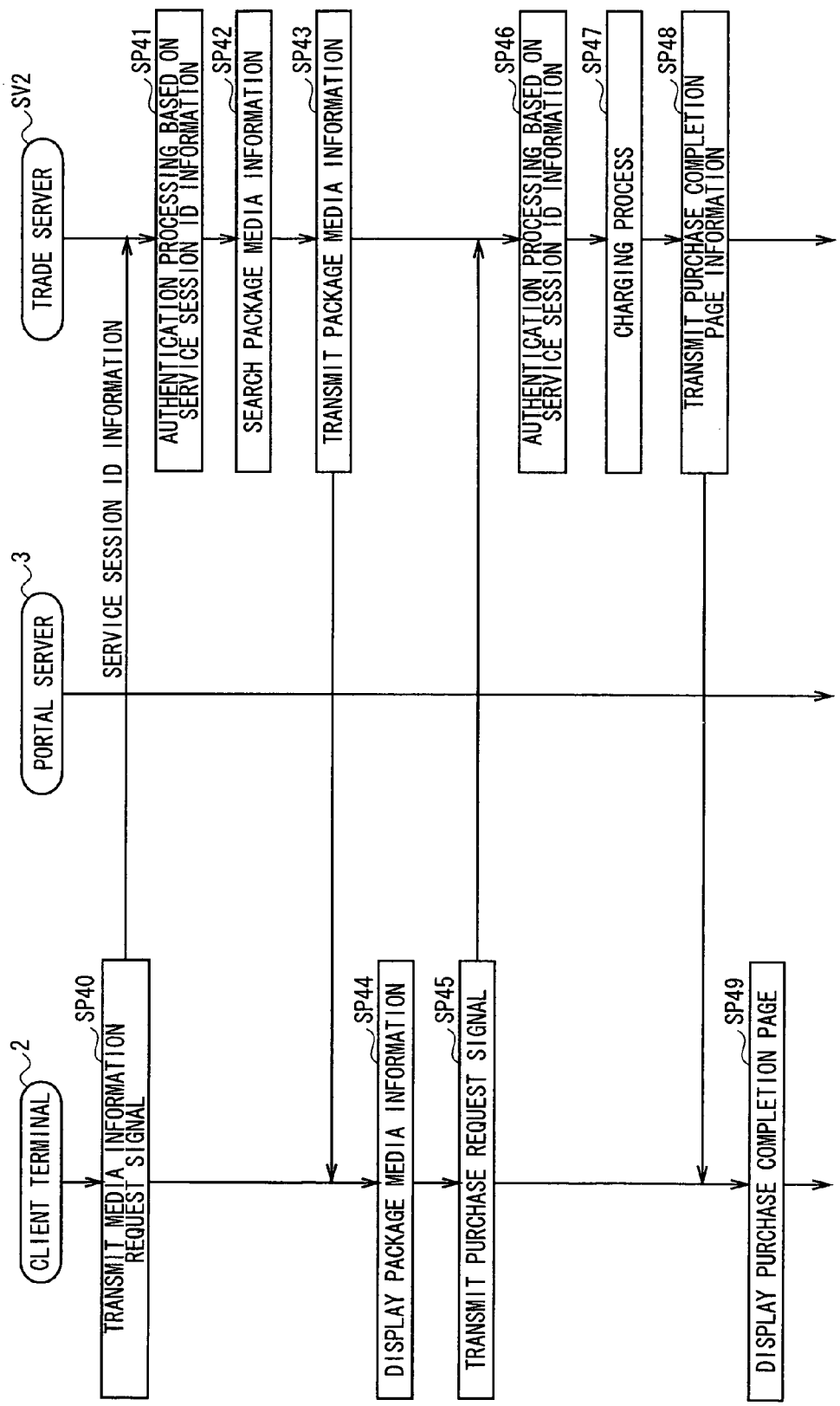
FIG. 12 is a sequence chart showing a sales service provision process.

With reference to FIG. 12, the sales service provision process will be described. In the sales service provision process, the client terminal 2 receives sales services from the sales server SV2.

At step SP40, if control commands which selects a part of the package-media-sales page information displayed as images on the display section 25 are input from the input processing section 21, the control section 23 of the client terminal 2 generates a media information request signal. The media information request signal requests package media information relating to a specific package media which corresponds to the control commands.

The control section 23 then transmits the media information request signal, the service session ID information and the like to the sales server SV2 via the communication control section 32 and the network interface 33 in order. The service session ID information was issued by the sales server SV2 and temporarily stored in the authentication information storage section 38.

At step SP41, the control section 90 of the sales server SV2 receives the media information request signal, the service session ID information and the like transmitted from the client terminal 2 via the network interface 93 and the communication control section 92 in order, and then supplies the service session ID information and the like to the authentication processing section 95.

The authentication processing section 95 under the control of the control section 90 performs user authentication processes. In the user authentication process, the authentication processing section 95 compares the service session ID information and the like received from the client terminal 2 with the ones temporarily stored in the authentication information storage section 97.

If the authentication processing section 95 authenticates that a user is legitimate, the control section 90 proceeds to step SP42. In this case, the user has requested the package media information relating to the package media using the client terminal 2.

At step SP42, the retrieval section 99 performs search processes based on a retrieval key in the media information request signal. In the search process, the retrieval section 99 searches a plurality of pieces of package media information stored in the package media information storage section 98 for a certain piece of package media information which corresponds to retrieval conditions shown in the retrieval key.

When the retrieval section 99 has the piece of package media information found, the control section 90 extends the period of validity of the service session ID information and the like issued to the client terminal 2 using the authentication processing section 95, and then proceeds to step SP43.

At step SP43, the control section 90 reads the package media information found by the retrieval section 99 from the package media information storage section 98. The control section 90 then transmits the package media information, the service session ID information having its period of validity extended by the authentication processing section 95, and the like to the client terminal 2 via the communication control section 92 and the network interface 93 in order.

At step SP44, the control section 23 of the client terminal 2 receives the package media information, the service session ID information having its period of validity extended, and the like transmitted from the sales server SV2 via the network interface 33 and the communication control section 32 in order, and supplies the package media information to the page information generation section 36. The control section 23 of the client terminal 2 also supplies the service session ID information and the like received from the sales server SV2 to the authentication processing section 37.

The authentication processing section 37 under the control of the control section 23 temporarily stores the service session ID information and the like in the authentication information storage section 38. The service session ID information and the like which have their period of validity extended were received from the sales server SV2. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

The page information generation section 36 generates video data based on the package media information supplied from the control section 23. The page information generation section 36 then converts the video data to analog video signals using the display control section 24, and supplies the analog video signals to the display section 25.

After the display section 25 starts to display images of the package media information based on the analog video signals, the control section 23 proceeds to step SP45.

At step SP45, if control commands that request the purchase of the package media corresponding to the package media information displayed as images on the display section 25 are input from the input processing section 21, the control section 23 generates a purchase request signal in response to the control commands. The purchase request signal requests the purchase of the package media.

The control section 23 then transmits the purchase request signal, the service session ID information having its period of validity extended, and the like to the sales server SV2 via the communication control section 32 and the network interface 33 in order. The service session ID information was received from the sales server SV2 and temporarily stored in the authentication information storage section 38.

At step SP46, the control section 90 of the sales server SV2 receives the purchase request signal, the service session ID information and the like transmitted from the client terminal 2 via the network interface 93 and the communication control section 92 in order, and supplies the service session ID information and the like to the authentication processing section 95.

The authentication processing section 95 under the control of the control section 90 performs user authentication processes. In the user authentication process, the authentication processing section 95 compares the service session ID information and the like received from the client terminal 2 with the ones temporarily stored in the authentication information storage section 97.

As a result, if the authentication processing section 95 authenticates that the user who requests the purchase of package media using the client terminal 2 is legitimate, the control section 90 proceeds to step SP47.

At step SP47, the control section 90 performs sales processes. In the sales process, the control section 90 executes procedures to deliver the requested package media to the user of the client terminal 2. The control section 90 also transmits fee-charging information to the fee-charging server SV6 via the communication control section 92 and the network interface 93 in order. The fee-charging information is used for charging the user a fee for the purchased package media. Therefore, the fee-charging server SV6 performs fee-charging processes to charge the user a fee for the purchased package media.

The control section 90 also extends the period of validity of service session ID information and the like issued to the client terminal 2 using the authentication processing section 95.

At step SP48, after completing the fee-charging process, the control section 90 transmits purchase completion page information showing the completion of the purchase of package media, the service session ID information having its period of validity extended by the authentication processing section 95, and the like to the client terminal 2 via the communication control section 92 and the network interface 93 in order.

At step SP49, the control section 23 of the client terminal 2 receives the purchase completion page information, the service session ID information having its period of validity extended, and the like transmitted from the sales server SV2 via the network interface 33 and the communication control section 32 in order, and supplies the purchase completion page information to the page information generation section 36. The control section 23 also supplies the service session ID information and the like received from the sales server SV2 to the authentication processing section 37.

The authentication processing section 37 under the control of the control section 23 temporarily stores the service session ID information and the like in the authentication information storage section 38. The service session ID information and the like which have their period of validity extended were received from the sales server SV2. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

The page information generation section 36 generates video data based on the purchase completion page information supplied from the control section 23. The page information generation section 36 then converts the video data to analog video signals using the display control section 24, and supplies the analog video signals to the display section 25.

Therefore, the control section 23 can display images of the purchase completion page based on the analog video signals on the display section 25.

As described above, the client terminal 2 allows a user to purchase package media he/she wants using the sales services provided by the sales server SV2.

(1-8-3-3) On-Air-List Information Distribution Service Provision Process

Figure 13:
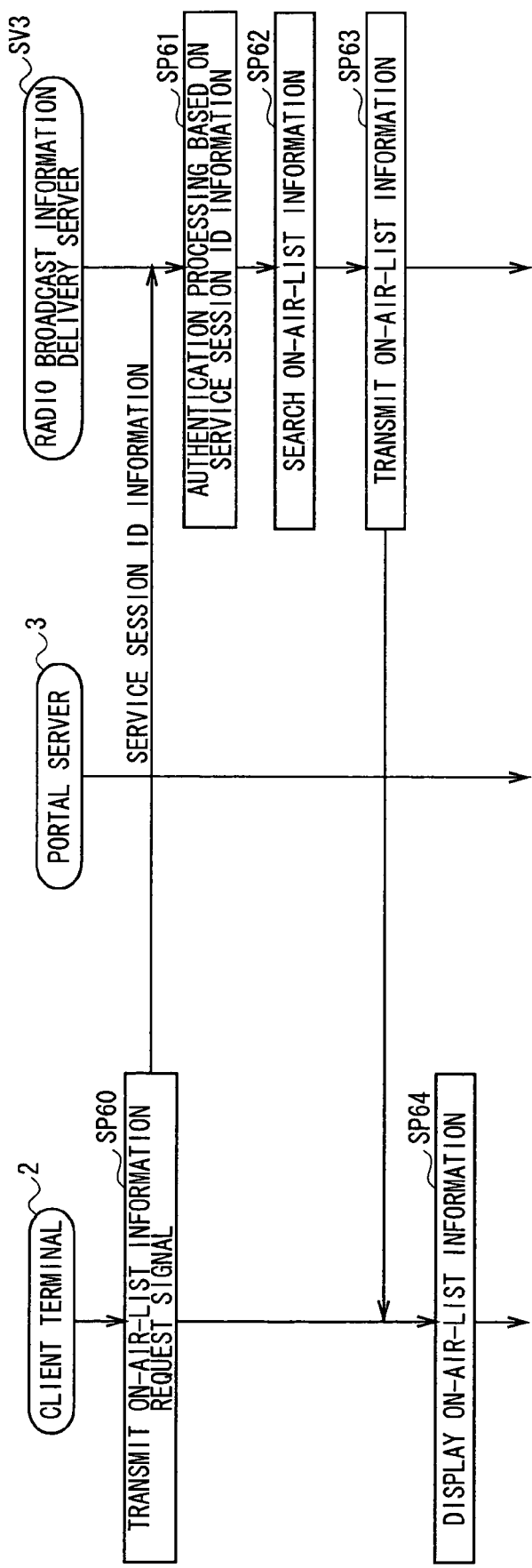
FIG. 13 is a sequence chart showing a radio broadcast information (on-air list information) distribution service provision process (1).

With reference to FIG. 13, radio broadcast information distribution service provision processes will be described. In the radio broadcast information distribution service provision process, the client terminal 2 receives the radio broadcast information distribution service, especially the on-air-list information distribution service from the radio broadcast information delivery server SV3.

At step SP60, a user input a retrieval key in an input box disposed on the on-air-list-information-distribution page being displayed as images on the display section 25. The retrieval key is a character string which corresponds to on-air-list information the user wants to obtain, and is used for retrieving the on-air-list information. At this time, control commands corresponding to the character string are input from the input processing section 21. The control section 23 of the client terminal 2 generates an on-air-list information request signal based on the inputted control commands. The on-air-list information request signal requests the download of the on-air-list information which the user wants to obtain.

The control section 23 then transmits the on-air-list information request signal, the service session ID information temporarily stored in the authentication information storage section 38, and the like to the radio broadcast information delivery server SV3 via the communication control section 32 and the network interface 33 in order. The service session ID information was issued by the radio broadcast information delivery server SV3.

At step SP61, the control section 110 of the radio broadcast information delivery server SV3 receives the on-air-list information request signal, the service session ID information and the like transmitted from the client terminal 2 via the network interface 113 and the communication control section 112 in order, and supplies the service session ID information and the like to the authentication processing section 115.

The authentication processing section 115 under the control of the control section 110 performs user authentication processes. In the user authentication process, the authentication processing section 115 compares the service session ID information and the like received from the client terminal 2 with the ones temporarily stored in the authentication information storage section 120.

As a result, if the authentication processing section 115 authenticates that a user who requests on-air-list information using the client terminal 2 is legitimate, the control section 110 proceeds to step SP62.

At step SP62, the retrieval section 118 performs search processes based on a retrieval key in the on-air-list information request signal. In the search process, the retrieval section 118 searches the whole on-air-list information in the on-air-list information storage section 117 for a certain part of the on-air-list information which meets retrieval conditions shown by the retrieval key to obtain the desired on-air-list information.

When the retrieval section 118 has the on-air-list information found, the control section 110 extends the period of validity of the service session ID information and the like issued to the client terminal 2 using the authentication processing section 115. The control section 110 then proceeds to step SP63.

At step SP63, the control section 110 reads the on-air-list information found by the retrieval section 118 from the on-air-list information storage section 117. The control section 110 then transmits the on-air-list information, the service session ID information having its period of validity extended by the authentication processing section 115, and the like to the client terminal 2 via the communication control section 112 and the network interface 113 in order.

At step SP64, the control section 23 of the client terminal 2 receives the on-air-list information, the service session ID information having its period of validity extended, and the like transmitted from the radio broadcast information delivery server SV3 via the network interface 33 and the communication control section 32 in order, and supplies the on-air-list information to the page information generation section 36. The control section 23 of the client terminal 2 also supplies the service session ID information and the like received from the radio broadcast information delivery server SV3 to the authentication processing section 37.

The authentication processing section 37 under the control of the control section 23 temporarily stores the service session ID information and the like in the authentication information storage section 38. The service session ID information and the like which have their period of validity extended were received from the radio broadcast information delivery server SV3. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

The page information generation section 36 generates video data based on the on-air-list information supplied from the control section 23. The page information generation section 36 then converts the video data to analog video signals using the display control section 24, and supplies the analog video signals to the display section 25. The display section 25 therefore displays images based on the analog video signals, i.e., it displays the on-air-list information.

As described above, the client terminal 2 allows a user to obtain the desired on-air-list information using the radio broadcast information distribution service provided by the radio broadcast information delivery server SV3.

(1-8-3-4) Now-On-Air Information Distribution Service Provision Process

Figure 14:
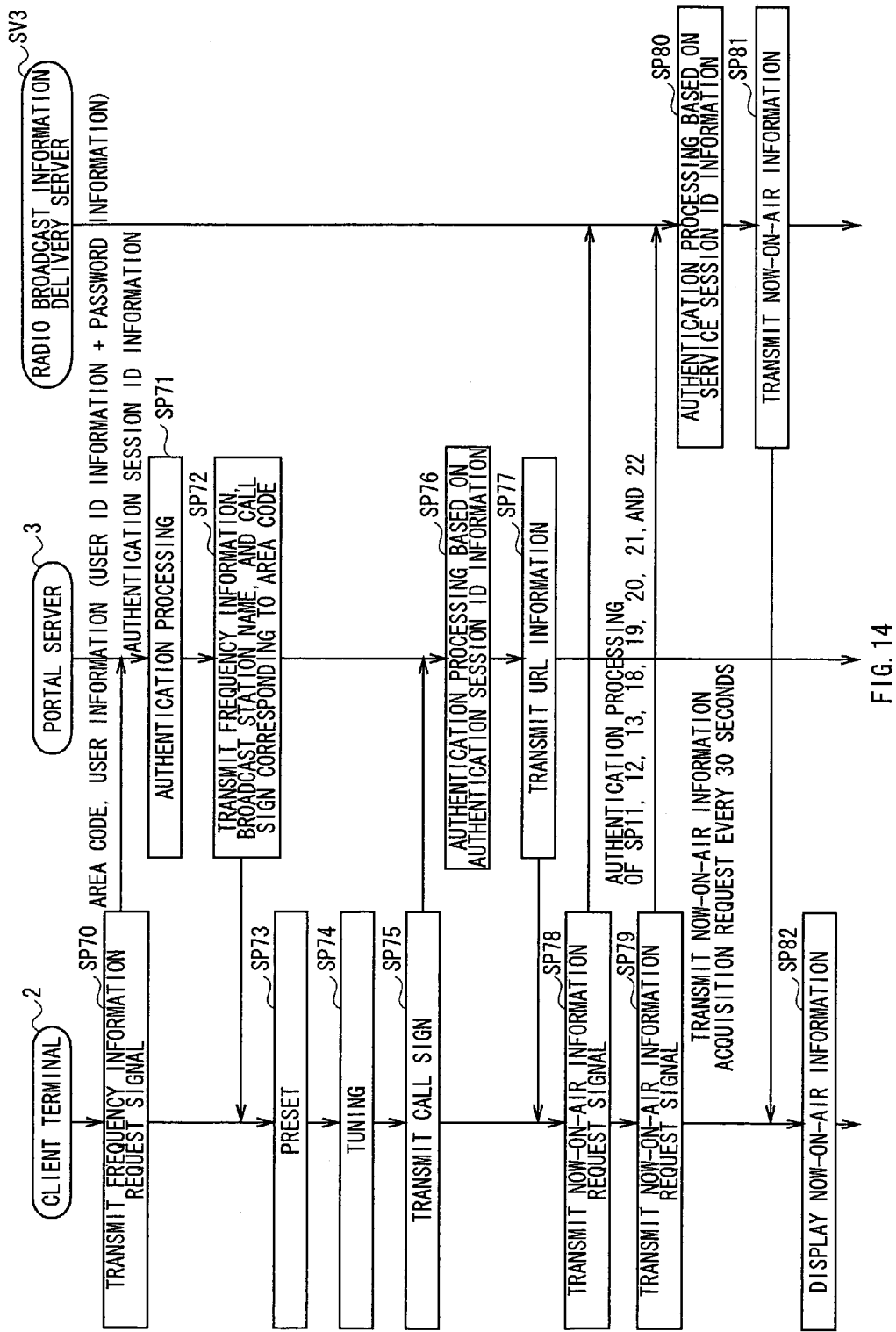
FIG. 14 is a sequence chart showing a radio broadcast information (now-on-air information) distribution service provision process (2).

With reference to FIG. 14, the radio broadcast information distribution service provision process will be described. In the radio broadcast information distribution service provision process, the client terminal 2 receives the radio broadcast information distribution service, especially the now-on-air information distribution service from the radio broadcast information delivery server SV3.

There is a plurality of radio broadcast information delivery servers SV3 providing now-on-air information, each of which corresponds to a different radio station (call sign).

At initial state, the client terminal 2 may not store URL information of these radio broadcast information delivery servers SV3 corresponding to each radio station.

With the radio broadcast information distribution service provision process described below, the situation in which the portal server 3 manages URL information of each radio broadcast information delivery server SV3 will be described. Specifically, in this case, the portal server 3 manages a plurality of pieces of URL information, each of which corresponds to a call sign of a radio station.

In addition, with the radio broadcast information distribution service provision process described below, the client terminal 2 does not have authentication session ID information and the like temporarily stored in the authentication information storage section 38, when requesting frequency information from the portal server 3 to automatically preset broadcast frequencies of radio stations. The frequency information includes the broadcast frequencies. In this case, first of all the client terminal 2 transmits user ID information, password information, and the like to the portal server 3.

At step SP70, if operation commands which request auto-preset of broadcast frequencies of radio stations are input from the input processing section 21, the control section 23 of the client terminal 2 transmits a frequency information request signal, an area code input by a user, the user ID information and password information stored in the authentication information storage section 38, and the like to the portal server 3 via the communication control section 32 and the network interface 33 in order. The frequency information request signal requests frequency information about broadcast frequencies of radio stations from which the client terminal 2 can receive their broadcasts.

At step SP71, the control section 50 of the portal server 3 receives the frequency information request signal, the area code, the user ID information, the password information and the like transmitted from the client terminal 2 via the network interface 53 and the communication control section 52 in order, and supplies the user ID information and password information received from the client terminal 2 to the authentication processing section 56.

The authentication processing section 56 under the control of the control section 50 performs user authentication processes. In the user authentication process, the authentication processing section 56 compares the user ID information, password information and the like received from the client terminal 2 with the customer information registered with the customer database section 54.

As a result, if the authentication processing section 56 authenticates that a user of the client terminal 2 is legitimate, the authentication processing section 56 determines that the request for frequency information received from the client terminal 2 is legitimate. Therefore, the authentication processing section 56 under the control of the control section 50 issues authentication session ID information and the like. The authentication session ID information identifies the communication connection being currently maintained between the client terminal 2 and the portal server 3. The authentication processing section 56 then temporarily stores the authentication session ID information and the like in the authentication information storage section 57.

The control section 50 subsequently proceeds to step SP72, as the authentication processing section 56 authenticates that the user is legitimate.

At step SP72, the control section 50 performs retrieving processes based on the area code received from the client terminal 2. In the retrieving process, the control section 50 retrieves a plurality of pieces of frequency information from the frequency information storage section 58. The control section 50 retrieves frequency information corresponding to the area code from lists including radio station names and call signs. The control section 50 also retrieves radio station names and call signs. The control section 50 then reads the retrieved information from the frequency information storage section 58 in list form.

The control section 50 subsequently transmits the listed frequency information, radio station names and call signs read from the frequency information storage section 58 with the authentication session ID information and the like to the client terminal 2 via the communication control section 52 and the network interface 53 in order. The authentication session ID information was issued to the client terminal 2 by the authentication processing section 56 at the above-noted step SP71.

At step SP73, the control section 23 of the client terminal 2 receives lists of the frequency information, radio station names and call signs transmitted from the portal server 3 via the network interface 33 and the communication control section 32 in order. The control section 23 of the client terminal 2 also receives the authentication session ID information and the like transmitted from the portal server 3 via the network interface 33 and the communication control section 32 in order. The control section 23 of the client terminal 2 then supplies the authentication session ID information and the like received from the portal server 3 to the authentication processing section 37. The control section 23 of the client terminal 2 also supplies the lists of the frequency information, radio station names and call signs to the display control section 24.

The authentication processing section 37 under the control of the control section 23 temporarily stores the authentication session ID information and the like received from the portal server 3 in the authentication information storage section 38.

The display control section 24 supplies the lists of the frequency information, radio station names and call signs to the display section 25. The display section 25 therefore displays the lists.

When selection commands are input from the input processing section 21, the control section 23 stores the selected frequency information, radio station names and call signs in the storage medium 29 (i.e. preset), and proceeds to step SP74.

At step SP74, when tuning control commands are input from the input processing section 21, the control section 23 controls the tuner section 31 based on the inputted tuning control commands such that the tuner section 31 extracts radio broadcast signals of a radio broadcast transmitted in a broadcast frequency corresponding to the tuning control commands from radio waves.

The tuner section 31 therefore extracts radio broadcast signals being transmitted, in the broadcast frequency from radio waves received by the broadcast signal reception section 30. The tuner section 31 then performs prescribed reception processes such as decoding to generate audio data, and supplies the audio data to audio control section 26.

The audio control section 26 therefore converts the audio data supplied from the tuner section 31 to analog audio signals, and supplies the analog audio signals to the speaker 27. As a result, the speaker 27 outputs audio of the selected radio program.

At step SP75, the radio broadcasting display control section 39 under the control of the control section 23 reads a call sign from the storage medium 29. In this case, the call sign stored in the storage medium 29 has been associated with the frequency information showing the broadcast frequency corresponding to the above-noted tuning control commands. The radio broadcasting display control section 39 then transmits the call sign, the authentication session ID information temporarily stored in the authentication information storage section 38, and the like to the portal server 3 via the communication control section 32 and the network interface 33 in order.

At step SP76, the control section 50 of the portal server 3 receives the call sign, the authentication session ID information and the like transmitted from the client terminal 2 via the network interface 53 and the communication control section 52 in order, and supplies the authentication session ID information and the like to the authentication processing section 56.

The authentication processing section 56 under the control of the control section 50 performs user authentication processes. In the user authentication process, the authentication processing section 56 compares the authentication session ID information and the like received from the client terminal 2 with the ones temporarily stored in the authentication information storage section 57.

As a result, if the authentication processing section 56 authenticates that a user who transmits the call sign using the client terminal 2 is legitimate, the control section 50 proceeds to step SP77. In this case, the authentication processing section 56 authenticates that the user is legitimate, since the authentication session ID information and the like received from the client terminal 2 have not expired yet.

At step SP77, the control section 50 performs retrieving processes based on the call sign received from the client terminal 2. In the retrieving process, the control section 50 retrieves a piece of URL information corresponding to the call sign from among a plurality of pieces of ULR information stored in the URL storage section 59.

The control section 50 also extends the period of validity of the authentication session ID information and the like issued to the client terminal 2 using the authentication processing section 56.

The control section 50 then reads the retrieved URL information from the URL storage section 59, and transmits the URL information, the authentication session ID information having its period of validity extended by the authentication processing section 56, and the like to the client terminal 2 via the communication processing section 52 and the network interface 53 in order.

At step SP78, the control section 23 of the client terminal 2 receives the URL information, the authentication session ID information having its period of validity extended, and the like transmitted from the portal server 3 via the network interface 33 and the communication control section 32 in order, and supplies the authentication session ID information and the like to the authentication processing section 37. The control section 23 of the client terminal 2 also supplies the URL information to the radio broadcasting display control section 39.

The authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have the period of validity extended. In this manner, the authentication session ID information and the like temporarily stored are updated to the ones having their period of validity extended.

The radio broadcasting display control section 39 under the control of the control section 23 associates the URL information supplied from the control section 23 with the call sign stored in the storage medium 29, and temporarily stores them in the storage medium 29 or the like.

Then, the radio broadcasting display control section 39 under the control of the control section 23 transmits a now-on-air information request signal which requests now-on-air information, the service session ID information temporarily stored in the authentication information storage section 38, and the like to the radio broadcast information delivery server SV3 via the communication control section 32 and the network interface 33 in order. In this case, the radio broadcasting display control section 39 transmits the now-on-air information request signal using the URL information temporarily being stored in the storage medium 29 or the like. The service session ID information stored in the authentication information storage section 38 was received from the radio broadcast information delivery server SV3.

In the radio broadcast information distribution service provision process, the process of step SP78 corresponds to the process of step SP10 illustrated in FIG. 10. In the process of step SP78, now-on-air information request signals, service session ID information and the like are transmitted from the client terminal 2 to the radio broadcast information delivery server SV3.

Accordingly, in the radio broadcast information distribution service provision process, the client terminal 2, the radio broadcast information delivery server SV3 and the portal server 3 performs the same user authentication processes as those of step SP11 through SP13 and step SP18 through SP22 following the process of step SP78, and then proceed to step SP79. By the way, the processes of step SP11 through SP13 and step SP18 through SP22 are illustrated in FIG. 10.

At step SP79, the radio broadcasting display control section 39 of the client terminal 2 under the control of the control section 23 re-transmits a now-on-air information request signal, the service session ID information temporarily stored in the authentication information storage section 38, and the like to the radio broadcast information delivery server SV3 via the communication control section 32 and the network interface 33 in order. The radio broadcasting display control section 39 transmits the now-on-air information request signal using the URL information temporarily being stored in the storage medium 29 or the like. The service session ID information stored in the authentication information storage section 38 was received from the radio broadcast information delivery server SV3.

At step SP80, the control section 110 of the radio broadcast information delivery server SV3 receives the now-on-air information request signal, the service session ID information and the like transmitted from the client terminal 2 via the network interface 113 and the communication control section 112 in order, and supplies the received authentication session ID information and the like to the authentication processing section 115.

The authentication processing section 115 under the control of the control section 110 performs user authentication processes. In the user authentication process, the authentication processing section 115 compares the service session ID information and the like received from the client terminal 2 with the ones temporarily stored in the authentication information storage section 120.

As a result, if the authentication processing section 115 authenticates that a user of the client terminal 2 is legitimate, the authentication processing section 115 determines that the request for now-on-air information received from the client terminal 2 is legitimate.

After the authentication processing section 115 authenticates that a user of the client terminal 2 is legitimate, the control section 110 extends the period of validity of the service session ID information and the like issued to the client terminal 2 using the authentication processing section 115, and proceeds to step SP81.

At step SP81, the control section 110 reads now-on-air information from the now-on-air information storage section 119, and transmits the now-on-air information, the service session ID information having its period of validity extended by the authentication processing section 115, and the like to the client terminal 2 via the communication control section 112 and the network interface 113 in order.

At step SP82, the control section 23 of the client terminal 2 receives the now-on-air information, the service session ID information having its period of validity extended and the like transmitted from the radio broadcast information delivery server SV3 via the network interface 33 and the communication control section 32 in order, and supplies the service session ID information and the like to the authentication processing section 37. The control section 23 of the client terminal 2 also supplies the now-on-air information to the radio broadcasting display control section 39.

The authentication processing section 37 under the control of the control section 23 temporarily stores the service session ID information and the like in the authentication information storage section 38. The service session ID information and the like which have their period of validity extended were received from the radio broadcast information delivery server SV3. In this case, the service session ID information and the like overwrite the ones previously and temporarily stored in the authentication information storage section 38. The information previously and temporarily stored in the authentication information storage section 38 does not have the period of validity extended. In this manner, the service session ID information and the like temporarily stored are updated to the ones having their period of validity extended.

The radio broadcasting display control section 39 supplies the now-on-air information supplied from the control section 23 to the display section 25 via the display control section 24. The display section 25 therefore displays the now-on-air information relating to radio programs currently being received.

After that, in the radio broadcast information distribution service provision process, the client terminal 2 repeats the request of now-on-air information (step SP79) at a certain interval of time. When receiving the request from the client terminal 2, the radio broadcast information delivery server SV3 sequentially performs the processes of step SP80 and SP81.

In this manner, the client terminal 2 can update now-on-air information being displayed on the display section 25 every second. The now-on-air information includes the following: a title of a radio program currently being received by the client terminal 2; a start time of the radio program; an end time of the radio program; an artist name and title of music currently being played in the radio program; and a start time of the broadcast of the music.

(2) Clip of Now-On-Air Information and Clip of CD Music Information

The clipping of now-on-air information and CD music information by the client terminal 2 will be described in detail.

As described above, the terminal device 2 can clip now-on-air information (which is radio broadcast information received from the radio broadcast information delivery server SV3) in response to a user's instruction or the like.

In this case, the control section 23 of the client terminal 2 stores the received now-on-air information in a clip database (FIG. 15) configured on the storage medium 29. The received now-on-air information is stored as clip data.

The control section 23 of the client terminal 2 is also able to clip CD music information automatically or in response to a user's instruction. Specifically, the control section 23 of the client terminal 2 obtain the CD music information from the CD music information provision server SV5 by transmitting TOC information of a music CD being played to the server SV5. The control section 23 stores the received CD music information in the clip database as clip data.

As described above, the control section 23 of the client terminal 2 is capable of receiving now-on-air information and CD music information from each server, and clipping them in response to a use's instruction or the like. In this case, clipping means that the control section 23 stores them in the clip database as clip data.

As shown in FIG. 15, the clip database has a plurality of columns; a "music title" column corresponding to a music title which is included in both now-on-air information and CD music information; a "artist name" column corresponding to a artist name which is included in both now-on-air information and CD music information; a "genre" column corresponding to genre information which is included in both now-on-air information and CD music information; a "source" column which indicates whether CDs or radio the stored clip data were received from, i.e., which indicates whether now-on-air information or CD music information the stored clip data are; a "registration date and time" column which indicates the date and time of the storing of clip data.

The control section 23 of the client terminal 2 stores each item of now-on-air information in a corresponding column when instructed to clip the now-on-air information. For example, the control section 23 stores a music title ("TO ME"), an artist name ("Hamazaki Ami"), a genre ("Pops"), a source ("Radio (Now-on-air information)"), and a registration date and time ("Jan. 5, 2004 10:35") in corresponding columns. In this manner, all the items are registered as one database record (one clip data).

The control section 23 of the client terminal 2 stores each item of CD music information in a corresponding column when instructed to clip the CD music information. For example, the control section 23 stores a music title ("SAKURA"), an artist name ("Sumashigao"), a genre ("Pops"), a source ("CD (CD music information)"), and a registration date and time ("Mar. 6, 2004 8:45") in corresponding columns. In this manner, all the items are registered as one database record (one clip data).

As noted above, the client terminal 2 stores clip data including information about a registration date and time and a source which indicates where the clip data is obtained from. The client terminal 2 thus can figure out if the clip data was obtained by clipping now-on-air information or CD music information. The client terminal 2 also can recognize when the clip data was registered. In the following description, now-on-air information and CD music information are also collectively referred to as "clip-target information".

If clip-target information (now-on-air information and CD music information) includes source information indicating where the clip-target information is obtained from, the control section 23 of the client terminal 2 puts the source information in a "source" column. Whereas if clip-target information does not include source information, the control section 23 finds out if the clip-target information was obtained by clipping now-on-air information or CD music information, and puts the corresponding information in a "source" column.

(3) Automatic Delete Process and Automatic Registration Process of Database Record The storage medium 29 of the client terminal 2 stores not only clip data obtained by clipping clip-target information, but also music data which are ripped from music CDs or downloaded from the music data delivery server SV1 or obtained from radio broadcasts or the like, for example.

The storage medium 29 therefore has a major content storage portion to store content data such as audio data and music data. On the other hand, the storage medium 29 has a much smaller clip storage portion for storing clip data such as clip-target information. In this case, the clip storage portion is used for the clip database.

Thereby, there is a possibility that the client terminal 2 can not store the latest-obtained clip-target information in the clip database as clip data, if the clip storage portion runs out of space. In such case, the client terminal 2 automatically selects the least important clip data (which is unnecessary and its priority of deletion is high) without user instruction to delete it, and automatically stores the latest-obtained clip-target information. The automatic delete process and automatic registration process of database record will be described in detail hereinafter.

When determining the priority of deletion, the control section 23 of the client terminal 2 checks source information and registration date and time information of clip data stored in the clip database. The control section 23 then determines the priority of deletion based on the information.

Figure 16:
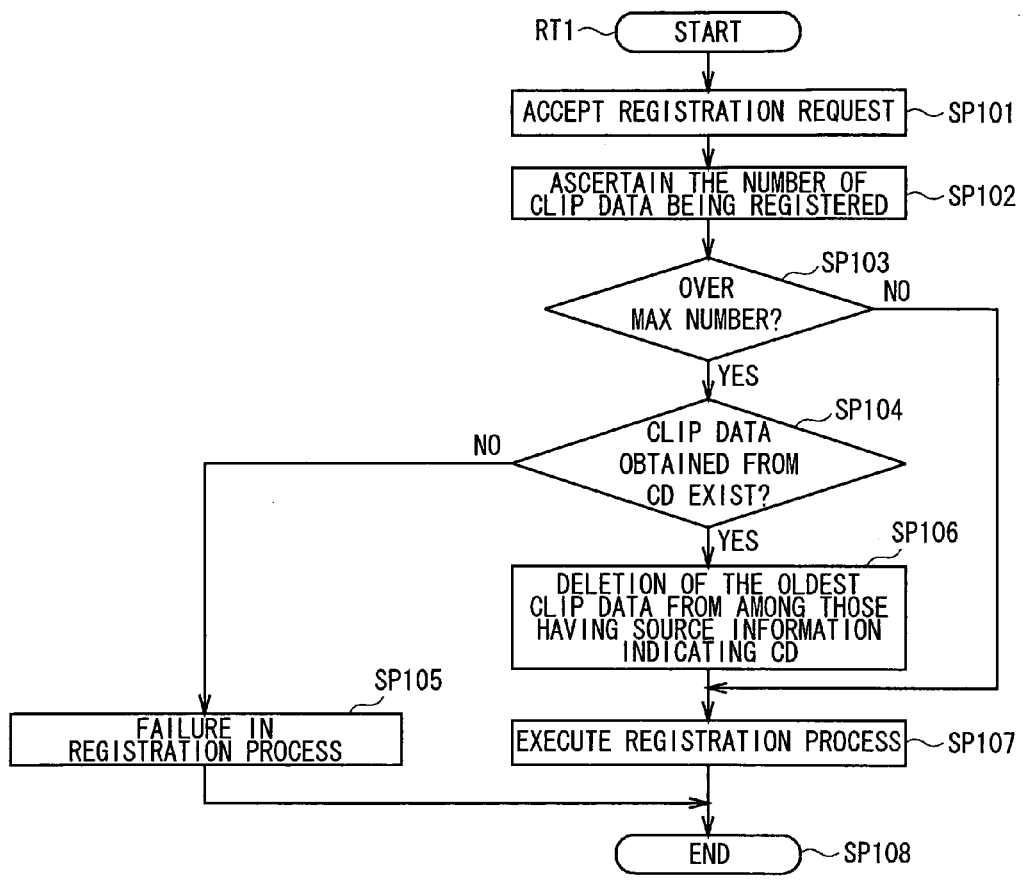
FIG. 16 is a flowchart showing an automatic delete process and an automatic registration process of CD music information.

(3-1) Automatic Delete Process and Automatic Registration Process of CD Music Information As shown in FIG. 16, the control section 23 of the client terminal starts a routine RT1 from start step and then proceeds to next step SP101.

At step SP101, when playing back an music CD using the external recording media recording and reproducing section 28 (FIG. 2), the control section 23 of the client terminal 2 accepts a user request (which is input by user operations) requesting the storing of CD music information relating to the music CD in the clip database as clip data. The control section 23 of the client terminal 2 in response to the request generates a CD music information request signal based on the TOC information of the music CD, and transmits the CD music information request signal to the CD music information provision server SV5 to obtain the CD music information relating to the music CD from the CD music information provision server SV5. And then the control section 23 of the client terminal 2 proceeds to next step SP102.

At step SP102, the control section 23 of the client terminal 2 checks the clip database to ascertain the number of clip data being registered, and then proceeds to next step SP103.

At step SP103, the control section 23 of the client terminal 2 checks whether or not the number of clip data being registered with the clip database is over the max number of clip data recordable on the clip storage portion. If the number of clip data being registered with the clip database is not over the max number, the control section 23 of the client terminal 2 judges negatively to proceed to next step SP107, since the clip storage portion still has some space to store other clip data.

Whereas if the number of clip data being registered with the clip database is over the max number, the control section 23 of the client terminal 2 at step SP103 judges positively to proceed to step SP104, since the clip storage portion does not have enough space to store other clip data.

At step SP104, the control section 23 of the client terminal 2 checks whether or not clip data which have source information indicating "CD music information" exist among those being registered with the clip database.

Negative judgment at step SP104 means that all of the clip data being registered with the clip database is now-on-air information, i.e., all of them is obtained by clipping now-on-air information. Then the control section 23 of the client terminal 2 proceeds to next step SP105.

At step SP105 the control section 23 of the client terminal 2 never automatically deletes the clip data being registered with the clip database. Even if the control section 23 of the client terminal 2 obtains new CD music information from the CD music information provision server SV5, the control section 23 abandons storing the new CD music information (a failure in the registration process). Because all of the clip data obtained from now-on-air information is very important information that may not be obtained again. The control section 23 therefore proceeds to next step SP108 and ends the process.

Positive judgment at step SP104 means that the clip data being registered with the clip database includes not only one having source information indicating "now-on-air information" but also one having source information indicating "CD music information", i.e., the clip database stores not only clip data of now-on-air information but also clip data of CD music information. Then the control section 23 of the client terminal 2 proceeds to next step SP106.

At step SP106, the control section 23 of the client terminal 2 judges that the oldest clip data (the clip data having the oldest registration date and time) of those having source information indicating "CD music information" is the least important clip data for a user (which means its priority of deletion is high). The control section 23 therefore automatically deletes the clip data from the clip database, and then proceeds to next step SP107.

At step SP107, the control section 23 of the client terminal 2 automatically stores new CD music information obtained from the CD music information provision server SV5 in the clip database as clip data, and proceeds to next step SP108 to end the process.

As described above, there is a situation where all of the clip data being registered with the clip database of the storage medium 29 have source information indicating "now-on-air information". In such situation, even if the control section 23 of the client terminal 2 obtains new CD music information from the CD music information provision server SV5, it never execute the automatic delete process and the automatic registration process, since CD music information is less important than clip data having source information of "now-on-air information". This prevents the client terminal 2 from deleting the user's important clip data from the clip database without the user being notified.

Figure 17:
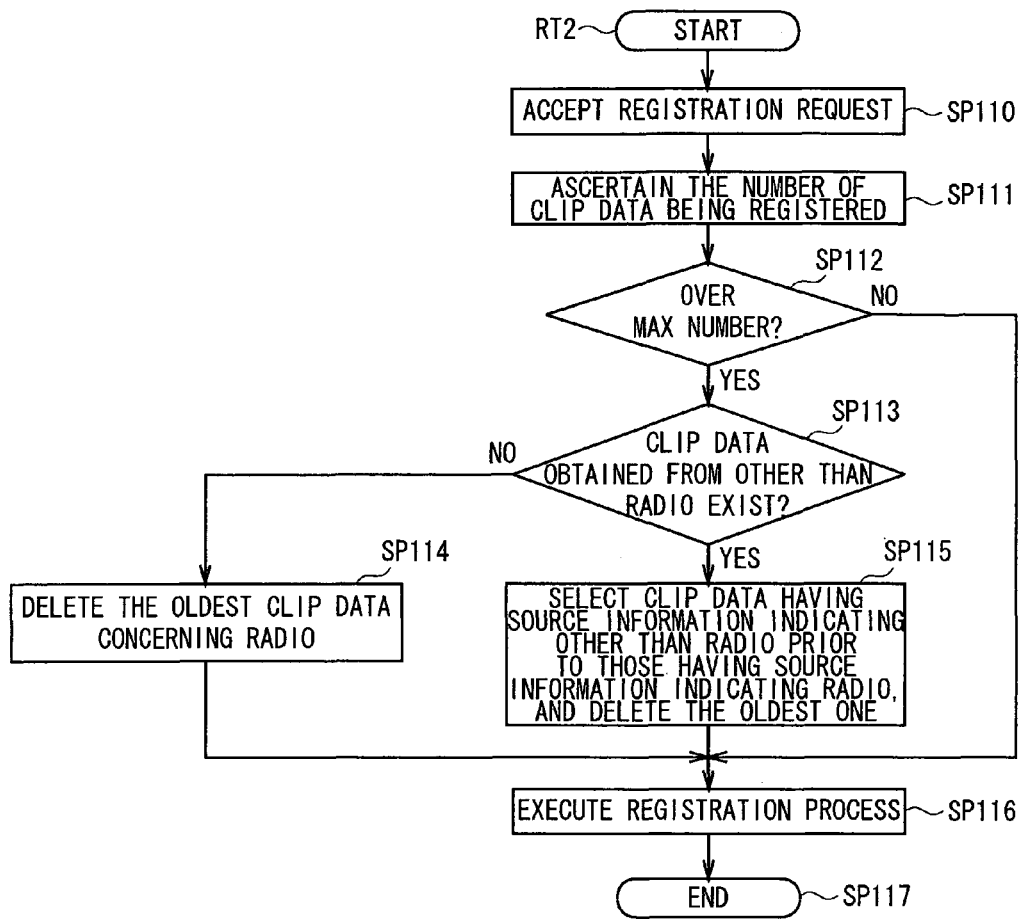
FIG. 17 is a flowchart showing an automatic delete process and an automatic registration process of now-on-air information.

(3-2) Automatic Delete Process and Automatic Registration Process of Now-On-Air Information As shown in FIG. 17, the control section 23 of the client terminal 2 starts a routine RT2 from start step and then proceeds to next step SP110.

At step SP110, the control section 23 of the client terminal 2 receives a radio program by the tuner section 31 (FIG. 2) from a certain radio station, and outputs music being played in the radio program via the audio control section 26 from the speaker 27. In addition, the control section 23 of the client terminal 2 obtains now-on-air information relating to the music from the radio broadcast information delivery server SV3. When the control section 23 of the client terminal 2 receives a registration request input by user operations, it proceeds to next step SP111. In this case, the registration request requests the registration of the now-on-air information with the clip database as clip data At step SP111, the control section 23 of the client terminal 2 checks the clip database to ascertain the number of clip data being registered, and then proceeds to next step SP112.

At step SP112, the control section 23 of the client terminal 2 checks whether or not the number of clip data being registered with the clip database is over the max number of clip data recordable on the clip storage portion. If the number of clip data being registered with the clip database is not over the max number, the control section 23 of the client terminal 2 judges negatively to proceeds to next step SP116, because the clip storage portion still has some space to store other clip data.

Whereas if the number of clip data being registered with the clip database is over the max number, the control section 23 of the client terminal 2 at step SP112 judges positively to proceed to step SP113, because the clip storage portion does not have enough space to store other clip data.

At step SP113, the control section 23 of the client terminal 2 checks whether or not clip data which have source information indicating other than "now-on-air information" exist among those being registered with the clip database.

Negative judgment at step SP113 means that all of the clip data being registered with the clip database is now-on-air information, i.e., all of them is obtained by clipping now-on-air information. Then the control section 23 of the client terminal 2 proceeds to next step SP114.

At step SP114, the control section 23 of the client terminal 2 judges that the oldest clip data (the clip data having the oldest registration date and time) of those having source information indicating "now-on-air information" is the least important clip data for a user (which means its priority of deletion is high). The control section 23 therefore automatically deletes the clip data from the clip database, and then proceeds to next step SP116.

Positive judgment at step SP113 means that the clip data being registered with the clip database include not only one having source information indicating "now-on-air information" but also one having source information indicating "CD music information". Then the control section 23 of the client terminal 2 proceeds to next step SP115.

At step SP115, the control section 23 of the client terminal 2 judges that the clip data having source information indicating "CD music information" (not "now-on-air information") are less important clip data for a user (which means their priority of deletion is high). The control section 23 of the client terminal 2 therefore automatically deletes the oldest one of them, and proceeds to next step SP116.

In the present embodiment, the control section 23 of the terminal device 2 judges that now-on-air information is more important for a user than CD music information. Because CD music information is obtainable whenever music CDs are being played, while now-on-air information is only obtainable when a user is listening to music broadcast in a radio program.

At step SP116, the control section 23 of the client terminal 2 automatically stores new now-on-air information obtained from the radio broadcast information delivery server SV3 in the clip database as clip data, and proceeds to next step SP117 to end the process.

As described above, the control section 23 of the client terminal 2 checks whether the clip data being registered with the clip database of the storage medium 29 is one having source information indicating "now-on-air information" or "CD music information". If the check shows that the clip data has source information indicating "now-on-air information", the control section 23 judges that the clip data is the most important one for a user, and deletes clip data having source information indicating other than "now-on-air information" (clip data having source information indicating "CD music information", in this case) prior to others, since it is difficult to register again the clip data having source information indicating "now-on-air information".

(4) Operation and Effects

According to the configuration described above, the client terminal 2 of the music related service provision system 1 obtains new clip-target information (now-on-air information, CD music information and the like), and starts registration processes for registering the clip-target information with the clip database of the storage medium 29. If the clip storage portion which the clip database uses has run out of space, the client terminal 2 judges that the registration of the clip-target information is difficult. In addition, if the clip-target information is now-on-air information, the client terminal 2 judges that the clip-target information is the most important one that may not be obtained again, because now-on-air information is associated with broadcasts.

Accordingly, it is necessary to register the new now-on-air information with the clip database. The client terminal 2 therefore automatically selects clip data having source information indicating other than "radio (now-on-air information)" from among those being registered with the clip database, and deletes the selected data. If all clip data being registered with the clip database have source information indicating "radio (now-on-air information)", the client terminal 2 automatically selects clip data having the oldest registration date and time, and deletes the selected data.

The client terminal 2 then automatically stores the new now-on-air information in the clip storage portion's space obtained by deleting the clip data.

As noted-above, if the clip storage portion of the storage medium 29 runs out of space when the client terminal 2 receives now-on-air information, the client terminal 2 automatically selects less important clip-target information for a user (its priority of deletion is high) and forcibly deletes it to have spaces, and automatically register the now-on-air information with the spaces. Because now-on-air information is associated with music played in a radio program, and may not be obtained again. This prevents the client terminal 2 from deleting very important clip-target information registered as clip data. In addition, this ensures that the client terminal 2 registers new and important clip-target information with the clip database.

The client terminal 2 performs the processes described above without any user operations. Thereby, the client terminal 2 can register important clip-target information with the clip database of the storage medium 29 as clip data, without bothering users with the processes.

According to the configuration described above, if the clip storage portion in the storage medium 29 runs out of space, the client terminal 2 of the music related service provision system 1 forcibly and automatically selects less important clip-target information (its priority of deletion is high), and deletes it to have empty spaces. This prevents the client terminal 2 from deleting important clip-target information stored in the clip storage portion (i.e., the clip database) as clip data, without users being notified. Also, this ensures that the client terminal 2 stores new and important clip-target information.

(5) Configuration of Hardware Circuit Blocks of Client Terminal 2

(5-1) Circuit Configuration

Figure 18:
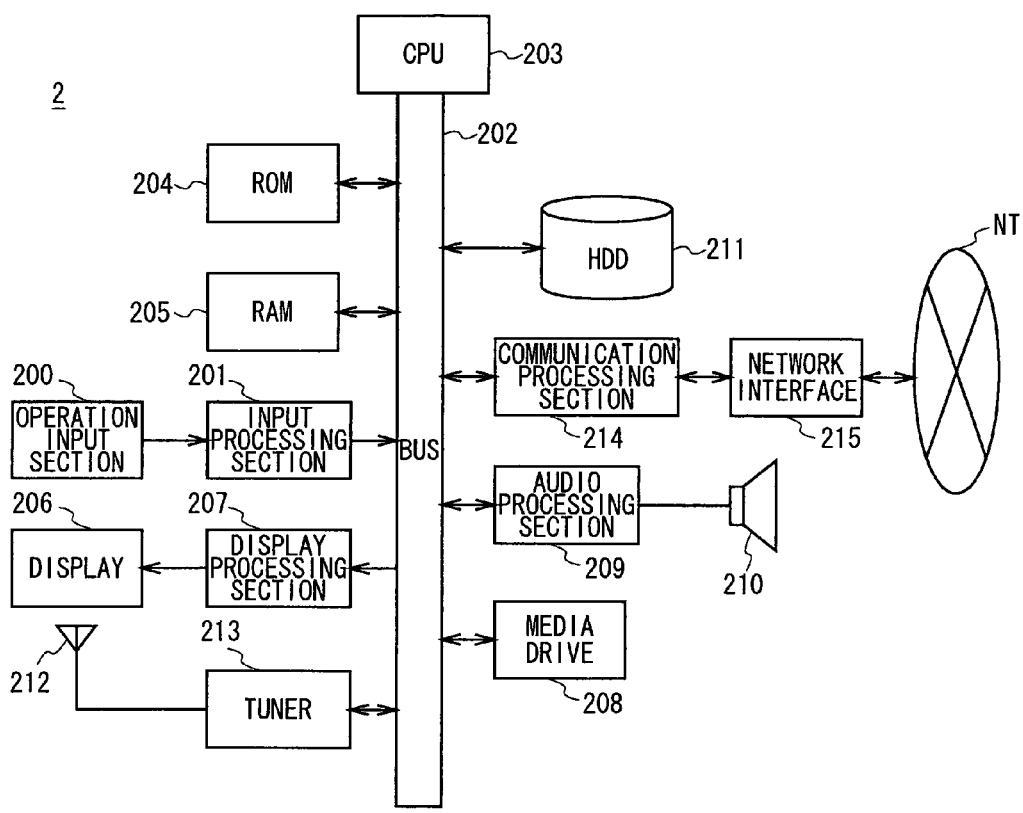
FIG. 18 is a block diagram showing the hardware configuration of a client terminal using the hardware circuit blocks.

With reference to FIG. 18, the configuration of hardware circuit block of the client terminal 2 will be described. The client terminal 2 illustrated in FIG. 18 is another example of configuration which performs the same processes as the client terminal 2 illustrated in FIG. 2 does. FIG. 2 illustrates the functional configuration of circuit block of the client terminal 2.

According to the configuration of hardware circuit of the client terminal 2, a part of functions of the client terminal 2 is performed by software modules as further described below.

The client terminal 2 has an operation input section 200 on its body surface or a remote control (not shown). The operation input section 200 provides various operation buttons. When users operate the operation input section 200, the operation input section 200 detects the operation and supplies an operation input signal corresponding to the operation to an input processing section 201.

The input processing section 201 performs a prescribed process for the supplied operation input signal to convert the signal to an operation command. The input processing section 201 then supplies the command via a bus 202 to a Central Processing Unit (CPU) 203.

A Read Only Memory (ROM) 204 pre-stores various programs, such as basic programs and application programs. The CPU 203 reads these programs from the ROM 204 via the bus 202, and loads them into a Random Access Memory (RAM) 205. The CPU 203 takes overall control of the client terminal 2 based on the programs, and performs prescribed arithmetic processes and various processes corresponding to the operation commands supplied from the input processing section 201.

For example, a display 206 is a display device such as a liquid crystal display. The display 206 may be directly or externally disposed on the body surface.

Processing results generated by the CPU 203 and various video data are supplied to the display 206 via a display processing section 207 as analog video signals. The display 206 displays images based on the analog video signals.

For example, CDs and MEMORY STICK (Registered Trademark of Sony Corporation) store content data. The MEMORY STICK consists of flash memories covered with exterior cases. A media drive 208, for example, reads content data from the CDs and the MEMORY STICK, and then reproduces them. Alternatively, the media drive 208 records record-target content data on the CDs or the MEMORY STICK.

If the media drive 208 reads video data (content data) from CDs or MEMORY STICK, the media drive 208 then supplies the video data to the display processing section 207 via the bus 202.

If the media drive 208 reads audio data (content data) from CDs or MEMORY STICK, the media drive 208 then supplies the audio data to an audio processing section 209.

The display processing section 207 performs digital-to-analog conversion for the video data supplied via the bus 202 to generate analog video signals. The display processing section 207 then supplies the analog video signals to the display 206. The display 206 displays images based on the analog video signals.

The audio processing section 209 performs digital-to-analog conversion for the audio data supplied via the bus 202 to generate analog audio signals. The audio processing section 209 then supplies the analog audio signals to a 2-channel speaker 210. The speaker 210 outputs sound on stereo based on the analog audio signals.

In addition, the CPU 203 is able to supply content data read by the media drive 208 via the bus 202 to a hard disk drive 211. The hard disk drive 211 stores the content data as content files.

The CPU 203 manages the content data stored in the hard disk drive 211 using the directory configuration illustrated by FIG. 3.

Also, the CPU 203 is capable of reading the content files stored in the hard disk drive 211 from the hard disk drive 211 as content data.

If the CPU 203 reads video data (content data) from the hard disk drive 211, the CPU 203 then supplies the video data to the display processing section 207 via the bus 202.

If the CPU 203 reads audio data (content data) from the hard disk drive 211, the CPU 203 then supplies the audio data to the audio processing section 209.

An antenna 212 receives radio broadcast waves broadcast from each radio station. The antenna 212 then supplies the radio broadcast waves to a tuner 213 such as AM/FM tuner.

For example, a user selects a certain radio station using the operation input section 200. The tuner 213 under the control of the CPU 203 extracts radio broadcast signals of the broadcast frequency that corresponds to the selected radio station from the radio broadcast waves received by the antenna 212. The tuner 213 then performs prescribed reception processes for the radio broadcast signals to generate audio data, and supplies the audio data via the bus 202 to the audio processing section 209.

The audio processing section 209 converts the audio data supplied from the tuner 213 to analog audio signals, then supplies the analog audio signals to the speaker 210. The speaker 210 therefore outputs sound of a radio program broadcast from a radio station. This allows users to listen to sound of the radio program.

The CPU 203 also may supply the audio data obtained by the tuner 213 to the hard disk drive 211 to record them on the hard disk drive 211. In this manner, the CPU 203 is able to record sound of radio programs.

The CPU 203 connects with a network NT via a communication processing section 214 and a network interface 215 in order. The CPU 203 therefore can accesses the portal server 3 and other servers SV1 through SV5 on the network NT, and interchanges various data with the portal server 3 and other servers SV1 through SV5.

(5-2) Configuration of Program Modules

Figure 19:
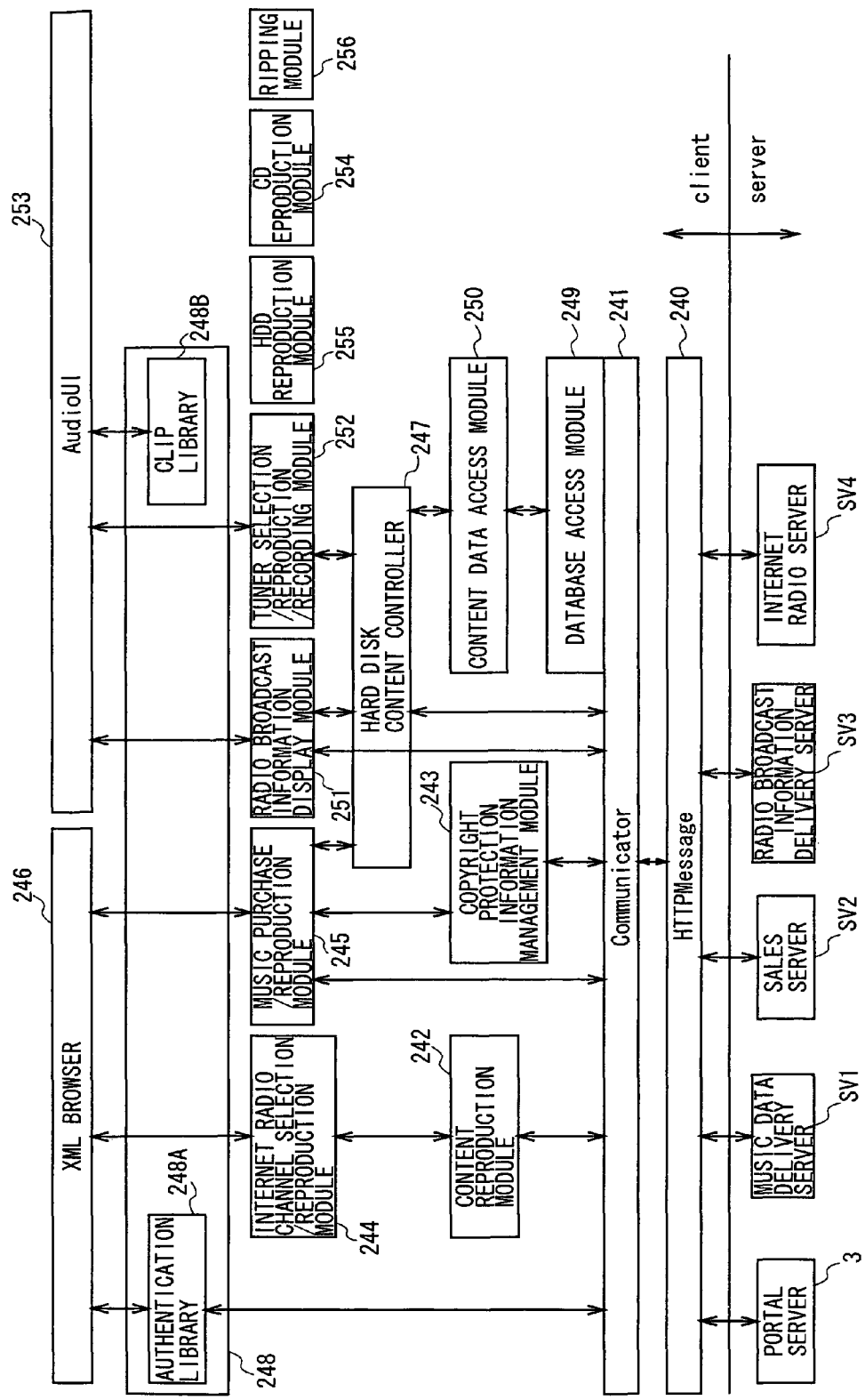
FIG. 19 is a schematic diagram showing program modules of the client terminal.

Program modules are applied to the client terminal 2 that has the hardware configuration described by the hardware circuit blocks shown in FIG. 18. As shown in FIG. 19, the program modules operate on OS, and interchanges with the portal server 3 and other servers SV1 through SV5 (SV5 is not shown here).

A Hyper Text Transfer Protocol (HTTP) message program 240 interchanges with the portal server 3 and other servers SV1 through SV5 in HTTP communication. A communicator program 241 interchanges data with the HTTP message program 240.

A content reproduction module 242 and a copyright protection information management module 243 are disposed above the communicator program 241. The content reproduction module 242 interprets the codec of contents, and reproduces them. The copyright protection information management module 243 deals with information relating to copyright protection. An Internet radio channel selection/reproduction module 244 and a music purchase/reproduction module 245 are disposed above the content reproduction module 242 and the copyright protection information management module 243 respectively. The Internet radio channel selection/reproduction module 244 selects channels of Internet radio and plays the selected channels. The music purchase/reproduction module 245 controls the purchase of music and the reproduction of demo music.

The Internet radio channel selection/reproduction module 244 and the music purchase/reproduction module 245 perform reproduction process to generate audio data. The audio data is transferred to the audio processing section 209 to output audio from the speaker 210.

A XML browser 246 is disposed above the Internet radio channel selection/reproduction module 244 and the music purchase/reproduction module 245. The XML browser 246 interprets XML files received from various servers, and then displays images on the display 206.

For example, a user selects a piece of music using the XML browser 246. The music purchase/reproduction module 245 therefore performs purchasing processes for purchasing the piece of music. The purchased piece of music is supplied via a hard disk content controller 247 to the hard disk drive 211 to stores it in the hard disk drive 211.

The communicator program 241 connects with an authentication library 248A of a library 248. The authentication library 248A performs various kinds of authentication processes in association with the portal server 3 and the like.

A database access module 249, a content data access module 250, and the hard disk content controller 247 are disposed above the communicator program 241.

The database access module 249 accesses various kinds of databases disposed in the hard disk drive 211. The content data access module 250 accesses content data stored in the hard disk drive 211. The hard disk content controller 247 manages content data stored in the hard disk drive 211.

A radio broadcast information display module 251 and a tuner selection/reproduction/recording module 252 are disposed above the hard disk content controller 247. The radio broadcast information display module 251 performs processes for displaying a title and artist name of music broadcast from radio stations. The tuner selection/reproduction/recording module 252 selects radio stations. The tuner selection/reproduction/recording module 252 also records content data (music) received from a radio station on the hard disk drive 211.

For example, a user selects a radio station using an audio user interface 253 to receive music from the radio station. The received music is supplied via the content data access module 250 to the hard disk drive 211 to stores it in the hard disk drive 211.

The tuner selection/reproduction/recording module 252 performs reproduction processes to generate audio data (content data). The audio data is supplied to the audio processing section 209 to output audio from the speaker 210.

The radio broadcast information display module 251 uses the tuner selection/reproduction/recording module 252 to receive radio broadcast information from the radio broadcast information delivery server SV3 via the HTTP message program 240. For example, the received radio broadcast information is now-on-air information about a title and artist name of music being broadcast by a radio station. The radio broadcast information display module 251 then transmits the information via the audio user interface (UI) 253 to the display 206 which displays the information.

The radio broadcast information, transmitted via the audio user interface 253 and displayed on the display 206, may be temporarily stored in a clip library 248B of the library 248. In response to user's instruction, the radio broadcast information is finally transferred via the database access module 249 to the hard disk drive 211 to be recorded on the hard disk drive 211 (which means that the information is clipped in the clip database).

A CD reproduction module 254 controls the media drive 208 to play back CDs.

Audio data played back from CDs by the CD reproduction module 254 are transferred to the audio processing section 209 to output audio from the speaker 210.

A HDD reproduction module 255 connects with the hard disk content controller 247 and the copyright protection information management module 243 (the connection is not shown here).

The HDD reproduction module 255 under the control of the hard disk content controller 247 reads audio data (content data) from the hard disk drive 211. The HDD reproduction module 255 then reproduces the audio data based on copyright management information supplied from the copyright protection information management module 243.

Audio data, reproduced by the HDD reproduction module 255 based on the copyright management information, is supplied to the audio processing section 209 to output audio from the speaker 210.

A ripping module 256 connects with the hard disk content controller 247 and the copyright protection information management module 243 (the connection is not shown here).

The ripping module 256 controls the CD reproduction module 254, the copyright protection information management module 243, and the hard disk content controller 247 to store (i.e., rip) audio data played back from CDs by the CD reproduction module 254 and its copyright management information in the hard disk drive 211. Specifically, the copyright management information is supplied from the copyright protection information management module 243 to control the audio data. The storage process of the audio data and copyright management information is also controlled by the hard disk content controller 247.

As for the program modules described above, the HTTP message program 240 and the communicator program 241 can perform the same function as the communication control section 32 of the client terminal 2 (FIG. 2) does.

The content reproduction module 242 can perform the same function as the encoder/decoder section 34 of the client terminal 2 (FIG. 2) does.

The copyright protection information management module 243 can perform the same function as the copyright management section 35 of the client terminal 2 (FIG. 2) does.

The Internet radio channel selection/reproduction module 244 can perform the same function as the control section 23 and audio control section 26 of the client terminal 2 (FIG. 2) do.

The music purchase/reproduction module 245 can perform the same function as the control section 23 and audio control section 26 of the client terminal 2 (FIG. 2) do.

The XML browser 246 can perform the same function as the input processing section 21 and page information generation section 36 of the client terminal 2 (FIG. 2) do.

The hard disk content controller 247, the database access module 249, and the content data access module 250 can perform the same function as the control section 23 of the client terminal 2 (FIG. 2) does.

The authentication library 248A of the library 248 can perform the same function as the authentication processing section 37 and the authentication information storage section 38 of the client terminal 2 (FIG. 2) do.

The clip library 248B of the library 248 can perform the same function as the control section 23 of the client terminal 2 (FIG. 2) does.

The radio broadcast information display module 251 can perform the same function as the radio broadcasting display control section 39 of the client terminal 2 (FIG. 2) does.

The tuner selection/reproduction/recording module 252 can perform the same function as the control section 23, audio control section 26 and tuner section 31 of the client terminal 2 (FIG. 2) do.

The audio user interface 253 can perform the same function as the input processing section 21, control section 23 and display control section 24 of the client terminal 2 (FIG. 2) do.

The CD reproduction module 254 can perform the same function as the audio control section 26 and external recording media recording and reproducing section 28 of the client terminal 2 (FIG. 2) do.

The HDD reproduction module 255 can perform the same function as the control section 23 and audio control section 26 of the client terminal 2 (FIG. 2) do.

The Ripping module 256 can perform the same function as the control section 23, external recording media recording and reproducing section 28 and encoder/decoder section 34 of the client terminal 2 (FIG. 2) do.

Accordingly, the client terminal 2 illustrated by FIG. 18 (which has the hardware configuration of hardware circuit blocks) can perform the same function as the client terminal 2 illustrated by FIG. 2 (which has the hardware configuration of functional circuit blocks) does, as the CPU 203 performs processes based on the above-noted program modules.

(5-3) Configuration of Hardware Circuit Blocks of Each Server

The hardware configuration of the portal server 3, music data delivery server SV1, sales server SV2, radio broadcast information delivery server SV3 will be described using hardware circuit blocks.

The functions of the portal server 3, music data delivery server SV1, sales server SV2, radio broadcast information delivery server SV3 may be provided using software. In this case, the hardware configuration of these servers 3, SV1, SV2, SV3 illustrated by using hardware circuit blocks may be applied.

Figure 20:
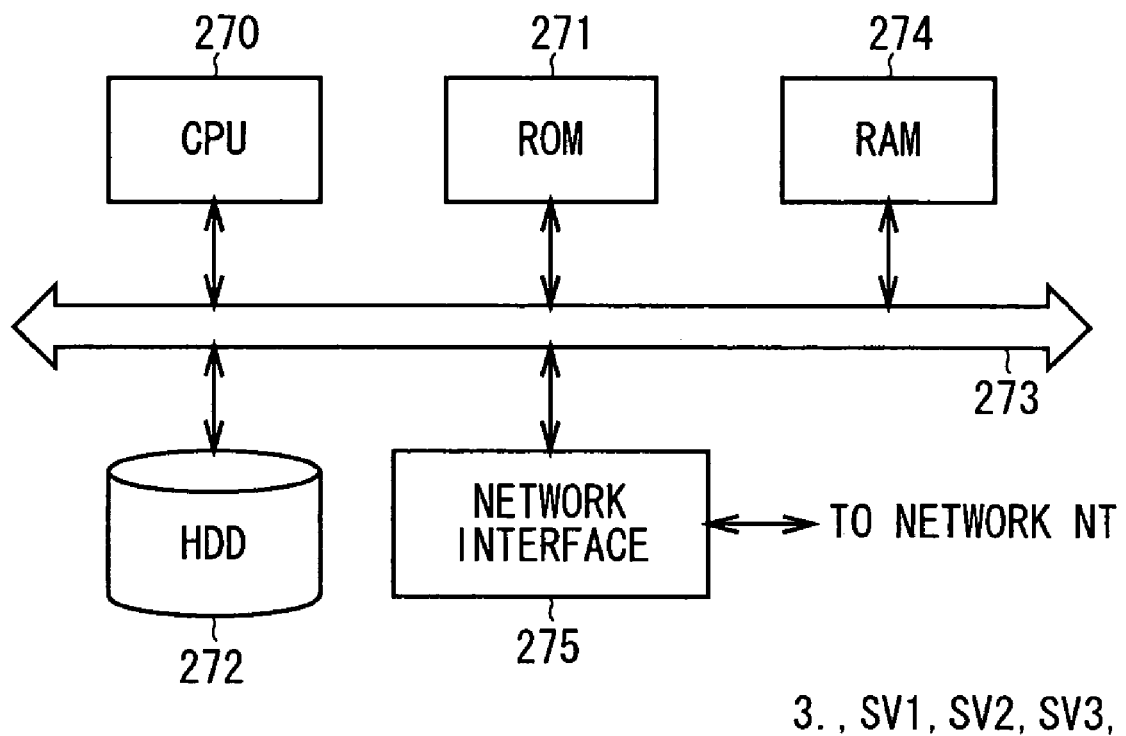
FIG. 20 is a block diagram showing the hardware configuration of each server using hardware circuit blocks.

With reference to FIG. 20, the basic hardware configuration of server will be described. This hardware configuration is illustrated by using hardware circuitry blocks. This hardware configuration can be applied to the portal server 3, the music data delivery server SV1, the sales server SV2, and the radio broadcast information delivery server SV3.

The server has a CPU 270 to take overall control of the whole parts. A ROM 271 or a hard disk drive 272 stores various kinds of programs, such as basic programs and application programs. The CPU 270 loads these programs to a RAM 274 via a bus 273 when needed, to execute various processes.

The hard disk drive 272 is capable of permanently or temporarily storing information and various kinds of data, such as content data and page information which can be open to the public on a network. The hard disk drive 272 may also have databases created to store various kinds of registration information such as customer information.

The CPU 270 reads various kinds of data, information and registration information from the hard disk drive 272 to perform various kinds of processes based on the data, the information and the registration information.

A network interface 275 connects with the client terminal 2 and other servers via the network NT to interchange various kinds of data and information with the client terminal 2 and the other servers.

In this server, the CPU 270 essentially performs various kinds of processes based on various kinds of programs stored in the ROM 271 or the hard disk drive 272

If programs to be stored in the ROM 271 or the hard disk drive 272 are selected based on the functions that the portal server 3 illustrated by FIG. 4 (which illustrates the hardware configuration using functional circuit blocks) provides, the CPU 270 of the server can perform the same function as the control section 50, communication control section 52, and authentication processing section 56 of the portal server 3 do. In addition, the hard disk drive 272 can be used as the customer database section 54, page information storage section 55, authentication information storage section 57, frequency information storage section 58 and URL storage section 56 of the portal sever 3.

If programs to be stored in the ROM 271 or the hard disk drive 272 are selected based on the functions that the music data delivery server SV1 illustrated by FIG. 5 (which illustrates the hardware configuration using functional circuit blocks) provides, the CPU 270 of the server can perform the same function as the control section 70, communication control section 72, authentication processing section 75, and retrieval section 79 of the music delivery server SV1 do. In addition, the hard disk drive 272 can be used as the customer database section 74, page information storage section 76, authentication information storage section 77, and music data storage section 78 of the music data delivery server SV1.

If programs to be stored in the ROM 271 or the hard disk drive 272 are selected based on the functions that the sales server SV2 illustrated by FIG. 6 (which illustrates the hardware configuration using functional circuit blocks) provides, the CPU 270 of the server can perform the same function as the control section 90, communication control section 92, authentication processing section 95, and retrieval section 99 of the sales server SV2 do. In addition, the hard disk drive 272 can be used as the customer database section 94, page information storage section 96, authentication information storage section 97, and package media information storage section 78 of the sales server SV2.

If programs to be stored in the ROM 271 or the hard disk drive 272 are selected based on the functions that the radio broadcast information delivery server SV3 illustrated by FIG. 7 (which illustrates the hardware configuration using functional circuit blocks) provides, the CPU 270 of the server can perform the same function as the control section 110, communication control section 112, authentication processing section 115, and retrieval section 118 of the radio broadcast information delivery server SV3 do. In addition, the hard disk drive 272 can be used as the customer database section 114, page information storage section 116, on-air-list information storage section 117, now-on-air information storage section 119 and authentication information storage section 120 of the radio broadcast information delivery server SV3.

As described above, programs to be stored in the ROM 271 or the hard disk drive 272 are selected properly. Therefore, the server having the hardware configuration illustrated by hardware circuit blocks can perform all functions of the portal server 3, the music delivery server SV1, the sales server SV2, and the radio broadcast information delivery server SV3 (each of which has the hardware configuration illustrated by functional circuit blocks in FIG. 4 through FIG. 7).

(6) Other Embodiments

With the above-noted embodiments, when the control section 23 of the client terminal 2 deletes clip data from clip databases, the control section 23 determines its "priority of deletion" based on its source information. However, the present invention is not limited to this. The control section 23 of the client terminal 2 may determine the priority of deletion based on other criteria such as registration date and time information and information showing how many times clip data being accessed.

If information showing how many times clip data being accessed is applied, the clip database adds a column for the information. If the information of content data shows that the content data has been accessed many times, the control section 23 of the client terminal 2 decreases the priority of deletion of the content data because it is contemplated that the control section 23 will access the content data many times, or the control section 23 increases the priority because it is contemplated that the control section 23 has accessed it enough.

With the above-noted embodiments, now-on-air information and CD music information are applied as clip-target information. However, this invention is not limited to this. Information obtained from recording media (the recording medium 29, a semiconductor memory such as MEMORY STICK (Registered Trademark of Sony Corporation), a Magneto-Optical Disc (MO), and the like) and broadcasts (television broadcasts, Internet broadcasts, and the like) may be applied as clip-target information.

For example, music information, associated with a piece of music downloaded from the music data delivery server SV1 to the client terminal 2, can be applied as clip-target information. The music information shows its music title, artist name, genre, and the like.

In this case, the control section 23 of the client terminal 2 for example determines that clip data having source information indicating "CD (CD music information)" (which is also referred to as "first clip data") is more important than the one having source information indicating "music information of downloaded music data" (which is also referred to as "second clip data"). The reason is the following: if the CD is once lost, it is difficult to obtain the first clip data again, whereas the second clip data is always obtainable from the music delivery server SV1. By the way, source information is also referred to as "data attribution information".

That is to say, the control section 23 of the client terminal 2 uses the degree of difficulty of acquisition of clip data and the like as criteria to determine the priority of deletion of the clip data. The degree of difficulty is determined from source information of the clip data. The control section 23 therefore determines that clip data having high degree of difficulty of acquisition is the most important. The clip data having high degree of difficulty of acquisition may be related to broadcast contents, such as radio broadcast, television broadcast, and Internet broadcast.

With the above-noted embodiments, the automatic deletion process and the automatic registration process are executed for the now-on-air information and CD music information stored as clip data in the clip storage portion. However, the present invention is not limited to this. The automatic deletion process and the automatic registration process may be executed for content data stored in the content storage portion.

In this case, the control section 23 of the client terminal 2 for example saves audio data obtained from radio broadcasts in the content storage portion prior to music data ripped from music CDs, because it is contemplated that the audio data is more important than the music data. In this manner, the control section 23 of the client terminal 2 determines the degree of importance of content data stored in the content storage portion from its source information, to save more important content data than others.

With the above-noted embodiments, CD music information relating to music CDs is obtained from the CD music information provision server SV5. However, the present invention is not limited to this. The client terminal 2 may obtain CD music information directly from a music CD, if the music CD records music data and text data including its CD music information or it has extra tracks recording its CD music information.

With the above-noted embodiments, CD music information, is obtained from the CD music information provision server SV5. However, the present invention is not limited to this. CD music information may be obtained from other servers being connected to the network NT. CD music information may also be obtained from CD music information databases storing CD music information. The CD music information database is for example pre-built in storage medium 29 of the client terminal 2.

With the above-noted embodiments, the CPU 203 loads programs pre-stored in the ROM 204 into the RAM 205, and controls program modules based on the programs to perform the above-noted automatic delete process and automatic registration process of clip data. However, the present invention is not limited to this. The client terminal 2 may have these programs installed by obtaining them from program storage media storing these programs to perform the above-noted automatic delete process and automatic registration process of clip data.

With the above-noted embodiments, the data storage control apparatus according to the present invention includes the control section 23, the storage medium 29, and the like. In this case, the control section 23 is equivalent to a determination means, a data deletion means, a data storage means and a data attribution detection means for detecting attribution of clip-target information (this information is data to be stored) and data attribution information (source information, for example). The storage medium 29 is equivalent to a storage medium. However, the present invention is not limited to this. The data storage control apparatus may have other circuitry structures.

With the above-noted embodiments, receivable broadcasts of the client terminal 2 are radio broadcasts broadcast from radio stations. However, the present invention is not limited to this. The client terminal 2 may receive Internet radio broadcasts, and obtain the radio broadcast information and other information relating to the broadcasts. The client terminal 2 may also receive satellite radio broadcasts, and obtain the radio broadcast information and other information relating to the broadcasts. Alternatively, the client terminal 2 may receive television broadcasts broadcast from television broadcast stations, and obtain various kinds of broadcast information relating to television programs from servers on the network NT.

With the above-noted embodiments, the client terminal 2 is equipped with the hardware circuit blocks, the functional circuit blocks, and the program modules. However, the present invention is not limited to this. Other terminals such as cellular phones, personal computers may be equipped with the hardware circuit blocks, the functional circuit blocks, and the program modules. Such terminals equipped with the hardware circuit blocks, the functional circuit blocks, and the program modules are capable of performing the same processes as the client terminal 2 does.

INDUSTRIAL APPLICABILITY

The data storage control apparatus in accordance with the present invention may be used for controlling the storage of music information relating to music obtained from the outside. The music information for example is stored in a storage medium having limited capacity.

The invention claimed is:

1. A data storage control apparatus comprising:
copying means for copying data from an external storage medium;
data attribution detection means for detecting attribution of storing-target data;
control means for setting deletion-target priority of said data based on said attribution, said control means determining when a source of said data is a radio broadcast based on said attribution;
determination means for determining whether or not the storage of said data is to be performed based on the attribution of said data detected by said data attribution detection means;
data deletion means for deleting data having an oldest storage date from among all data having a source which is not a radio broadcast when said determination means determines that the storage of said data is to be performed and a storage medium for storing said data runs out of space, and said data deletion means deleting data having an oldest storage date and a source which is a radio broadcast when said determination means determines that the storage of said data is to be performed, a storage medium for storing said data runs out of space, and all stored data has a source which is a radio broadcast; and
data storage means for storing said storing-target data in said storage medium after said data deletion means deletes the data having the oldest storage date from among all the data having a source which is not a radio broadcast;
wherein when attribution of said data shows that said data is title information corresponding to compact discs, said data deletion means is configured to determine that said deletion-target priority of said data is high to delete said data.

2. The data storage control apparatus according to claim 1, wherein said data attribution detection means detects attribution of said data based on applications which request the storage of said data.

3. The data storage control apparatus according to claim 1, wherein said data attribution detection means extracts data attribution information which said data contains to detect attribution of said data.

4. The data storage control apparatus according to claim 1, wherein the determination means determines the storage of said data is to be performed, when attribution of said data shows that said data is information relating to broadcast contents.

5. The data storage control apparatus according to claim 4, wherein the determination means determines the storage of said data is to be performed, when attribution of said data shows that said data is now-on-air information including title information of broadcast contents.

6. The data storage control apparatus according to claim 4, wherein the determination means determines the storage of said data is to be performed, when attribution of said data shows that said data is broadcast content data.

7. A computer-implemented data storage control method comprising:
copying data from an external storage medium;
detecting attribution of storing-target data;
setting deletion-target priority of said data based on said attribution, said setting including determining when a source of said data is a radio broadcast based on said attribution;
determining whether or not the storage of said data is to be performed based on the attribution of said data detected by said detecting;
deleting data with an oldest storage date from among all data having a source which is not a radio broadcast when said determining determines that the storage of said data is to be performed and a storage medium for storing said data runs out of space;

deleting data having an oldest storage date and a source which is a radio broadcast when said determining determines that the storage of said data is to be performed, a storage medium for storing said data runs out of space, and all stored data has a source which is a radio broadcast; and storing said storing-target data in said storage medium after said deleting deletes the data having the oldest storage date from among all the data having a source which is not a radio broadcast;

wherein when attribution of said data shows that said data is title information corresponding to compact discs, said deleting determines that said deletion-target priority of said data is high to delete said data.

8. The data storage control method according to claim 7, wherein attribution of said data is detected based on applications which request the storage of said data, at said detecting.

9. The data storage control method according to claim 7, wherein attribution of said data is detected by extracting data attribution information which said data contains, at said detecting.

10. The computer-implemented data storage control method according to claim 7, wherein it is determined that the storage of said data is to be performed, when attribution of said data shows that said data is information relating to broadcast contents, at said determining.

11. The computer-implemented data storage control method according to claim 10, wherein it is determined that the storage of said data is to be performed, when attribution of said data shows that said data is now-on-air information including title information of broadcast contents, at said determining.

12. The computer-implemented data storage control method according to claim 10, wherein it is determined that the storage of said data is to be performed, when attribution of said data shows that said data is broadcast content data, at said determining.

13. A computer storage medium including computer executable instructions, wherein the instructions, when executed by a processor, cause the processor to perform a method comprising:

copying data from an external storage medium;

detecting attribution of storing-target data;

setting deletion-target priority of said data based on said attribution, said setting including determining when a source of said data is a radio broadcast based on said attribution;

determining whether or not the storage of said data is to be performed based on the attribution of said data detected by said detecting;

deleting data with an oldest storage date from among all data having a source which is not a radio broadcast when said determining determines that the storage of said data is to be performed and a storage medium for storing said data runs out of space;

deleting data having an oldest storage date and a source which is a radio broadcast when said determining determines that the storage of said data is to be performed, a storage medium for storing said data runs out of space, and all stored data has a source which is a radio broadcast; and storing said storing-target data in said storage medium after said deleting deletes the data having the oldest storage date from among all the data having a source which is not a radio broadcast;

wherein when attribution of said data shows that said data is title information corresponding to compact discs, said deleting determines that said deletion-target priority of said data is high to delete said data.

14. The computer storage medium according to claim 13, wherein attribution of said data is detected based on applications which request the storage of said data, at said detecting.

15. The computer storage medium according to claim 13, wherein attribution of said data is detected by extracting data attribution information which said data contains, at said detecting.

16. The computer storage medium according to claim 13, wherein it is determined that the storage of said data is to be performed, when attribution of said data shows that said data is related information relating to broadcast contents, at said determining.

17. A data storage control apparatus comprising:

a copying unit, including a computer processor, configured to copy data from an external storage medium;

a data attribution detection unit configured to detect attribution of storing-target data;

a control unit configured to set deletion-target priority of said data based on said attribution, said control unit configured to determine when a source of said data is a radio broadcast based on said attribution;

a determination unit configured to determine whether or not the storage of said data is to be performed based on the attribution of said data detected by said data attribution detection unit;

a data deletion unit configured to delete data having an oldest storage date from among all the data having a source which is not a radio broadcast when said determination unit determines that the storage of said data is to be performed and a storage medium for storing said data runs out of space, and said data deletion unit configured to delete data having an oldest storage date and a source which is a radio broadcast when said determination unit determines that the storage of said data is to be performed, a storage medium for storing said data runs out of space, and all stored data has a source which is a radio broadcast; and a data storage unit configured to store said storing-target data in said storage medium after said data deletion unit deletes the data having the oldest storage date from among all the data having a source which is not a radio broadcast;

wherein when attribution of said data shows that said data is title information corresponding to compact discs, said data deletion unit is configured to determine that said deletion-target priority of said data is high to delete said data.

18. The data storage control apparatus according to claim 17, wherein said data attribution detection unit is configured to detect attribution of said data based on applications which request the storage of said data.

19. The data storage control apparatus according to claim 17, wherein said data attribution detection unit is configured to extract data attribution information which said data contains to detect attribution of said data.

20. The data storage control apparatus according to claim 17, wherein the determination unit is configured to determine the storage of said data is to be performed, when attribution of said data shows that said data is information relating to broadcast contents.

21. The data storage control apparatus according to claim 20, wherein the determination unit is configured to determine the storage of said data is to be performed, when attribution of said data shows that said data is now-on-air information including title information of broadcast contents.

22. The data storage control apparatus according to claim 20, wherein the determination unit is configured to determine the storage of said data is to be performed, when attribution of said data shows that said data is broadcast content data.

* * * * *